UNITED STATES PATENT OFFICE.

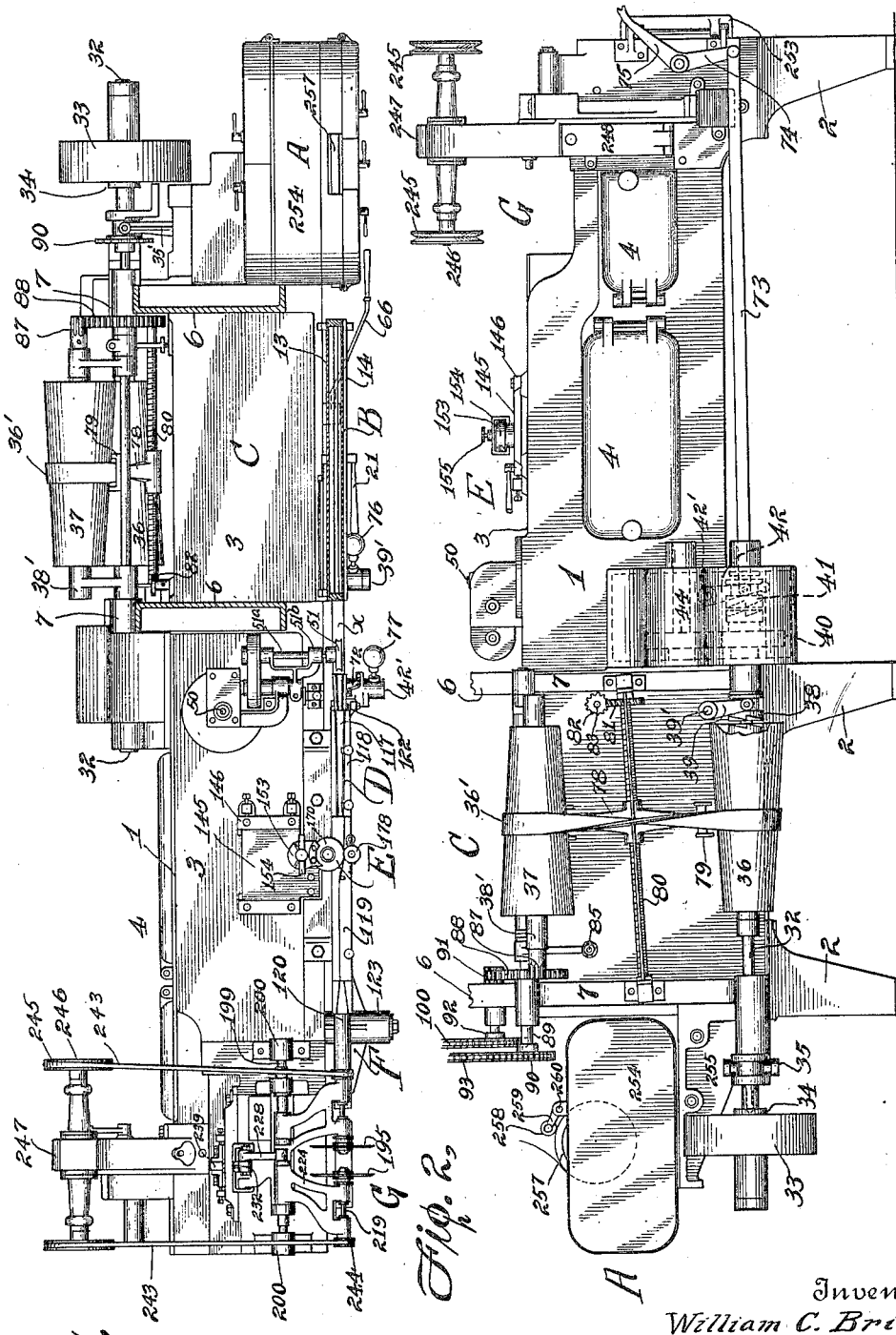

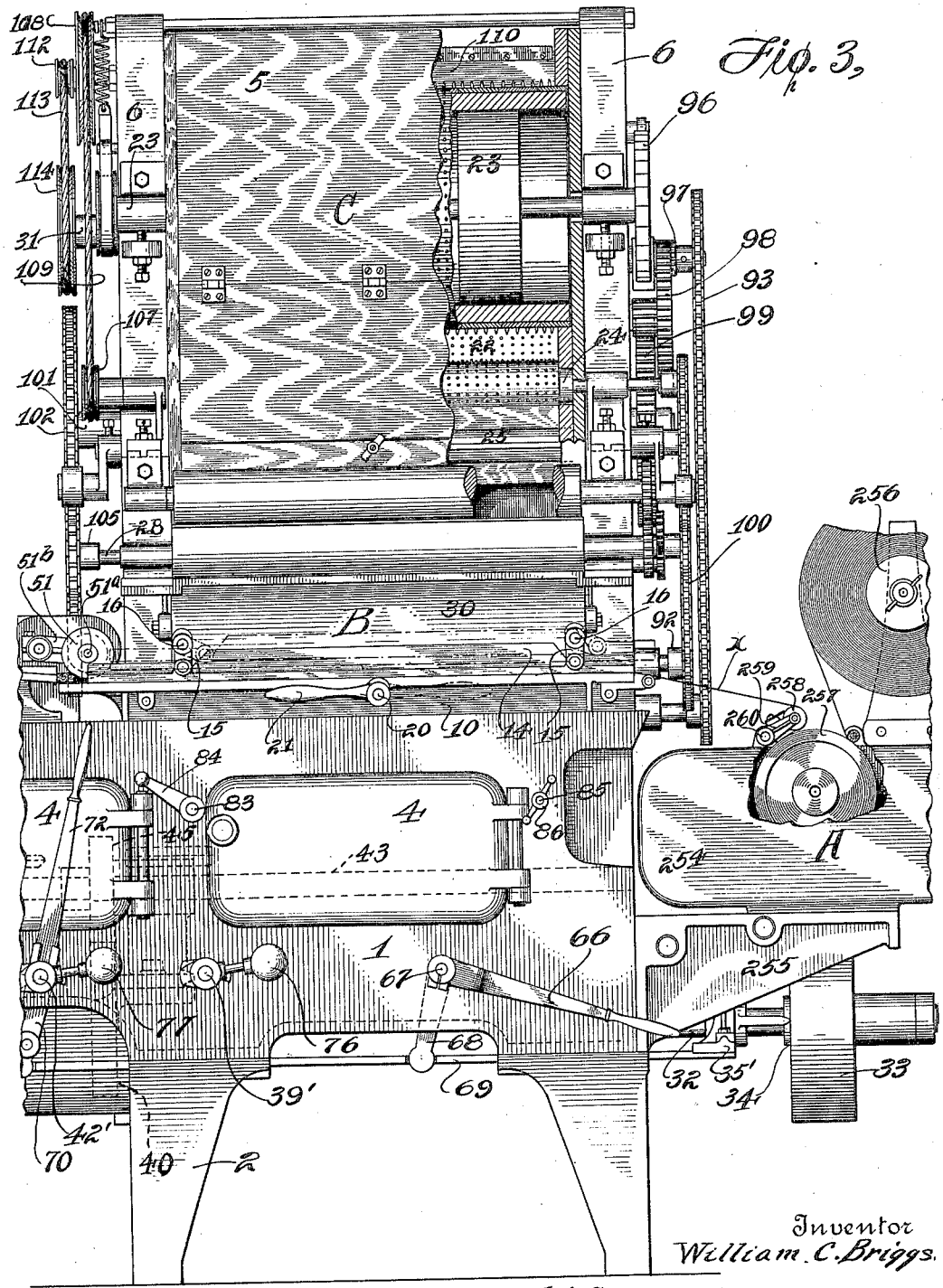

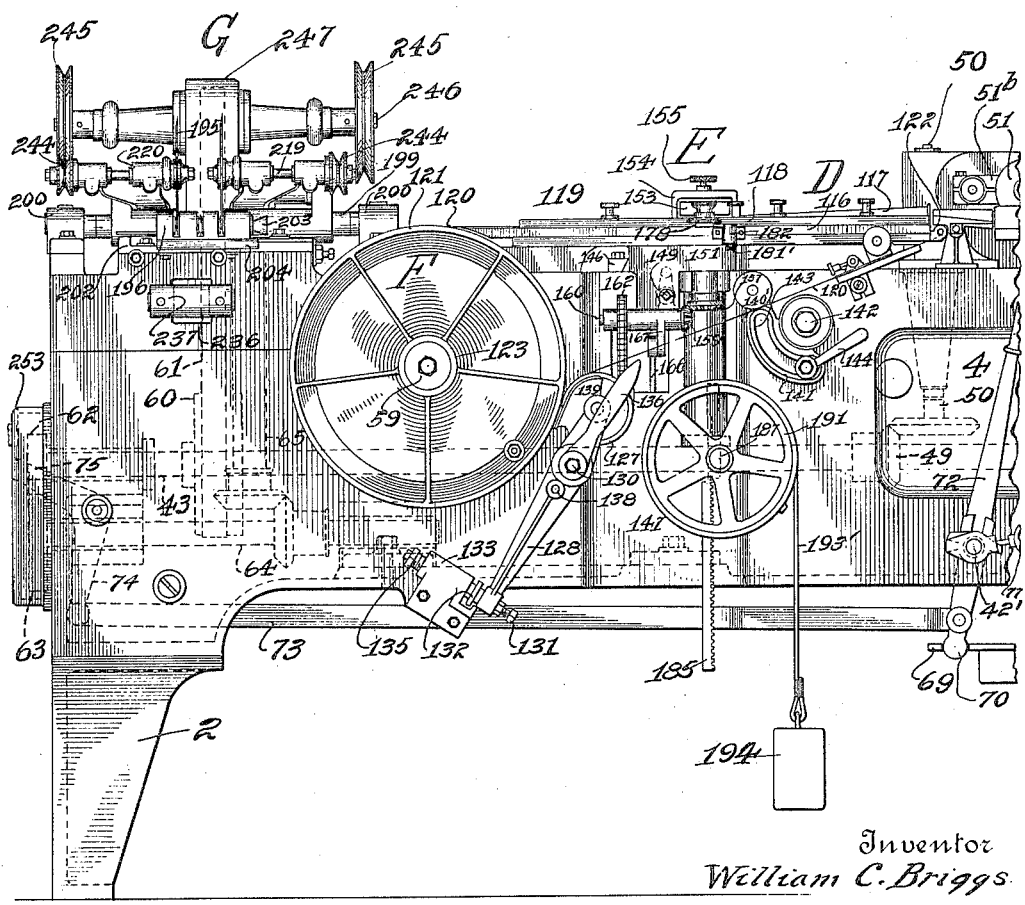

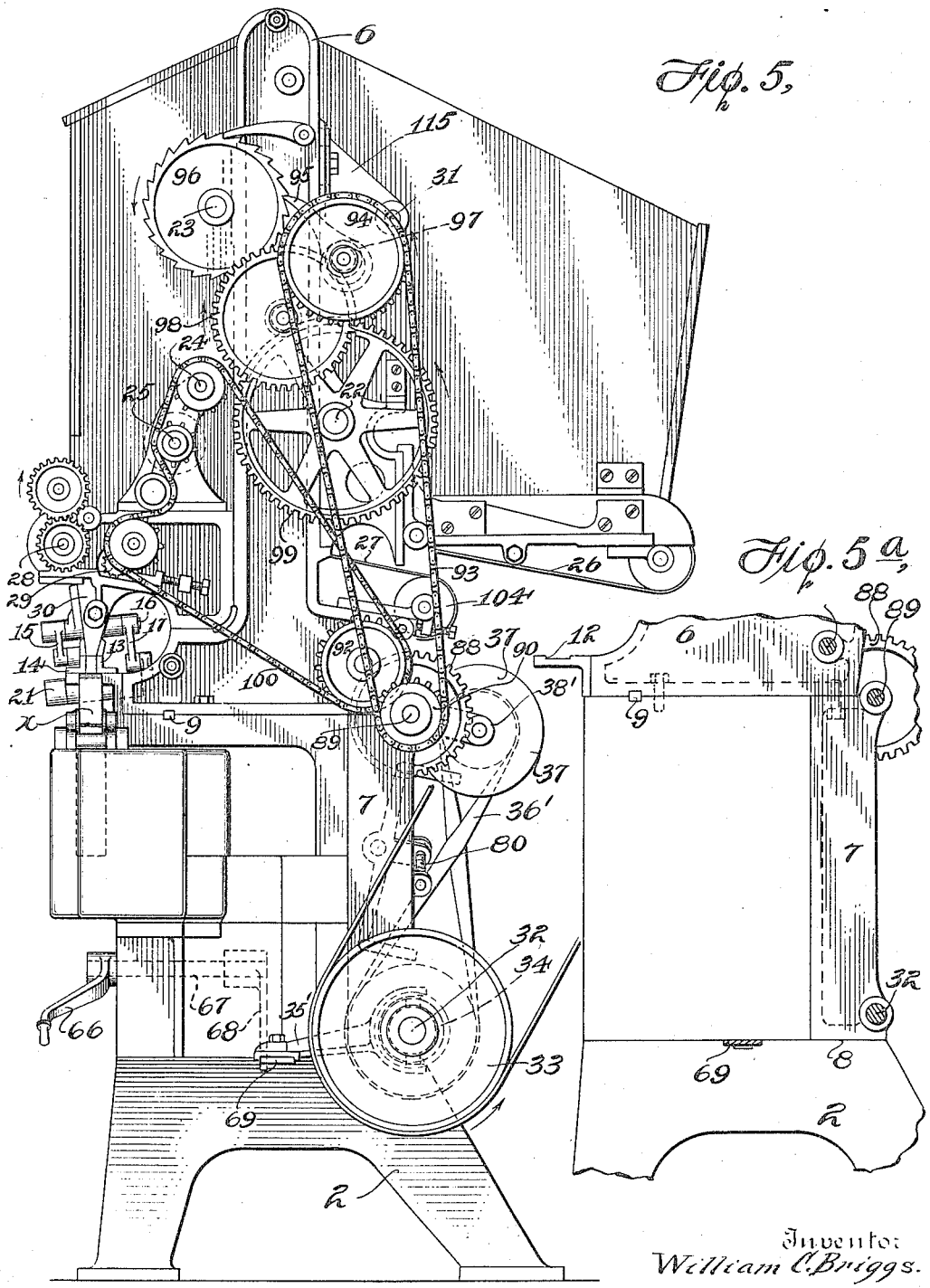

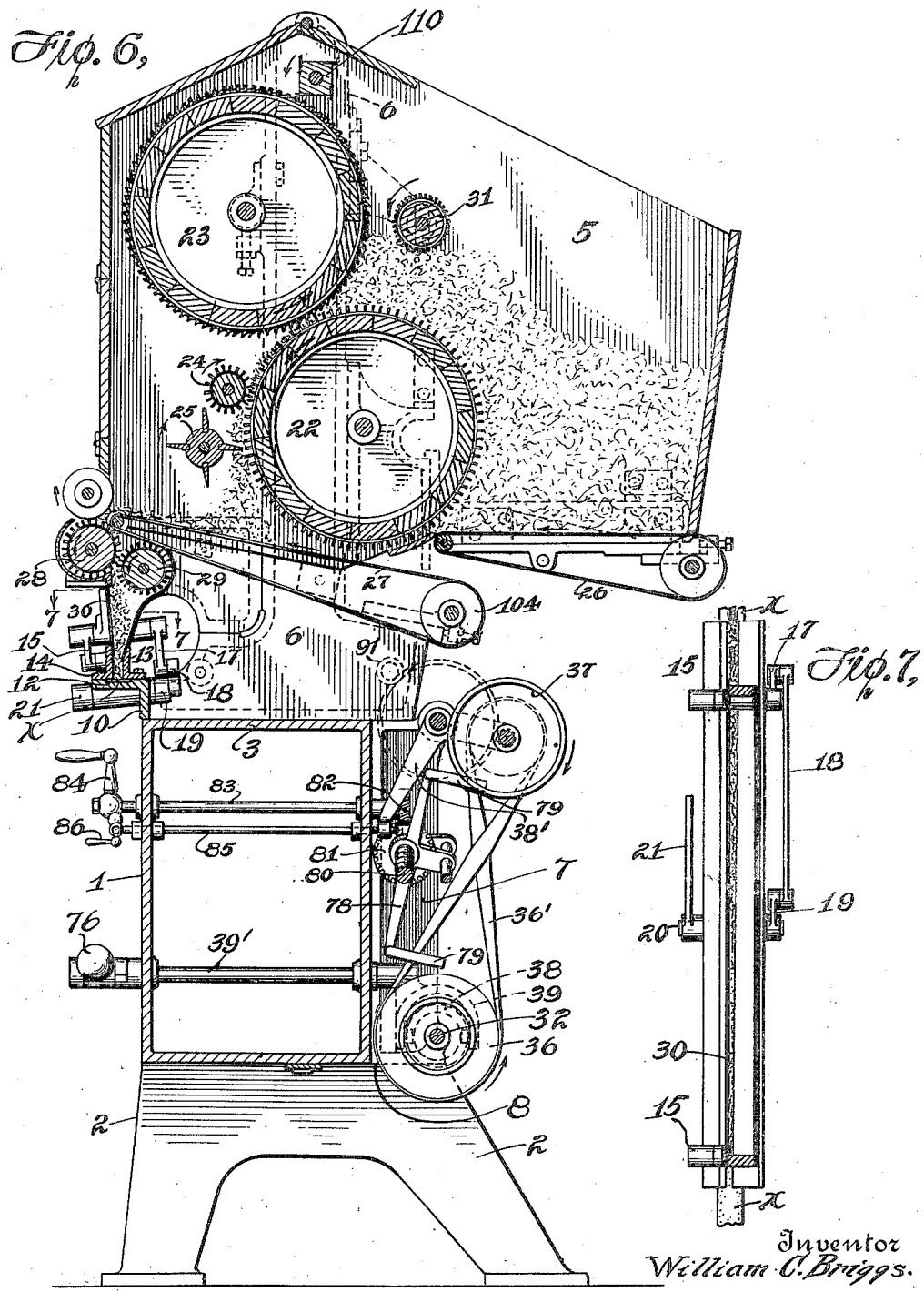

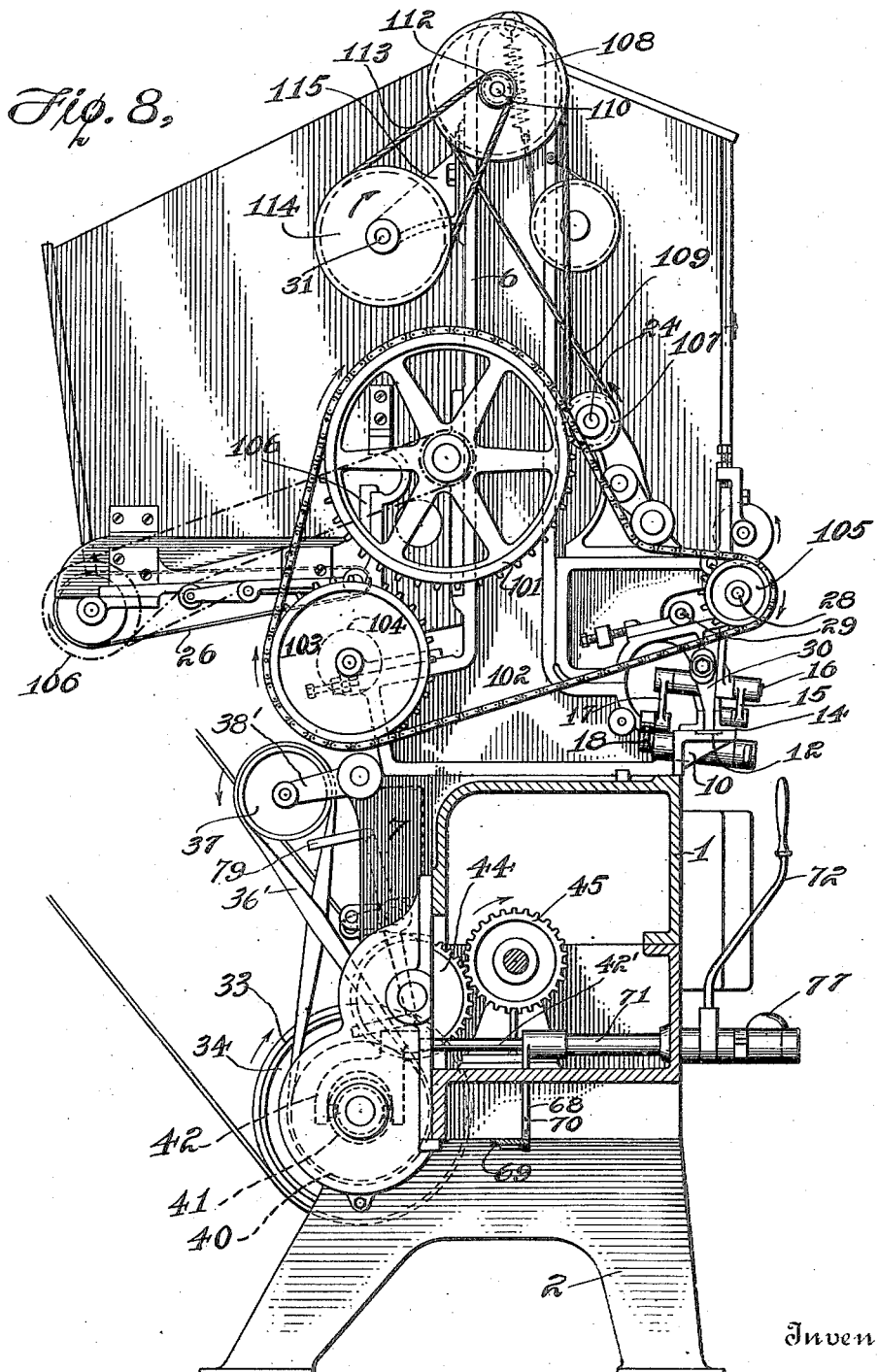

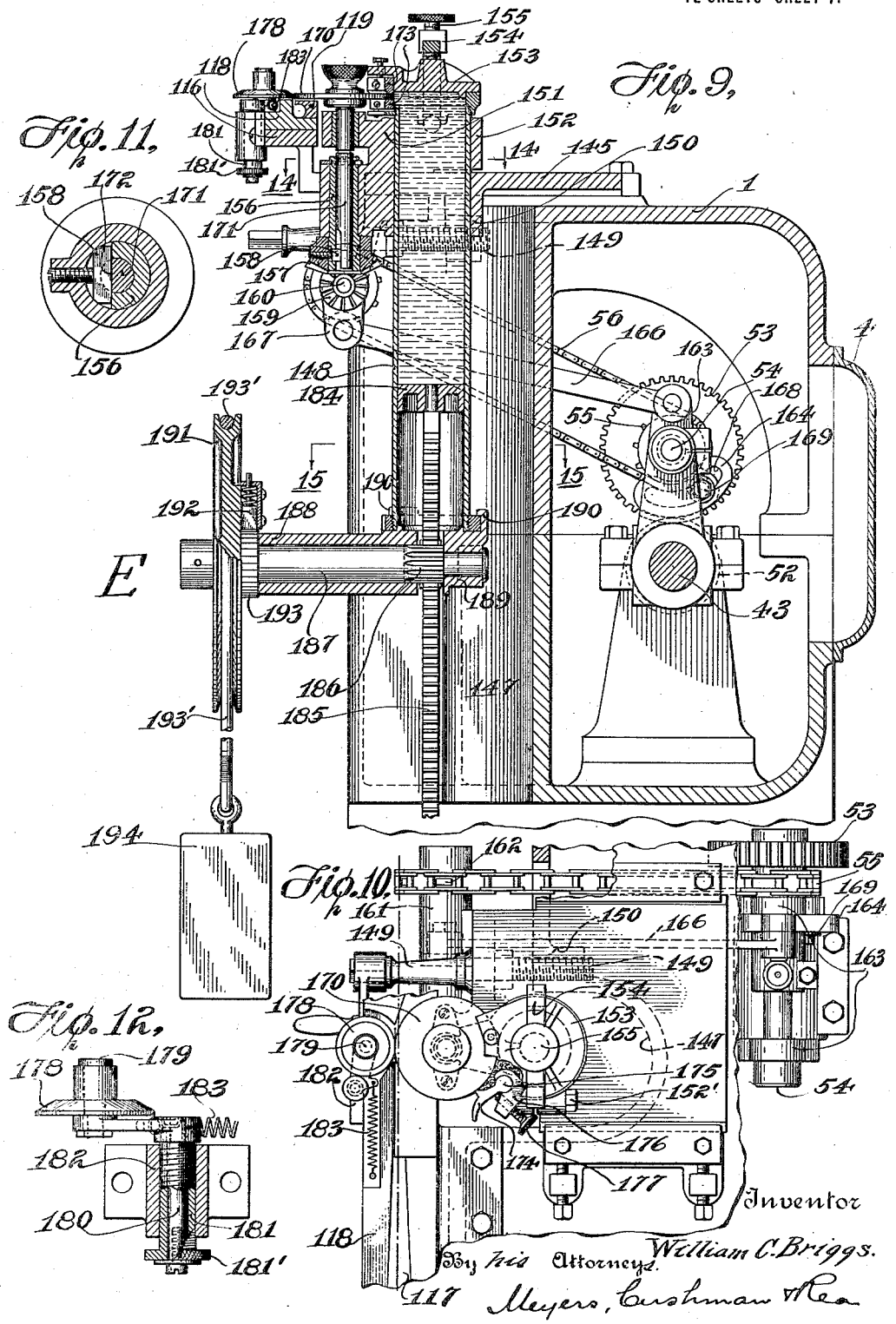

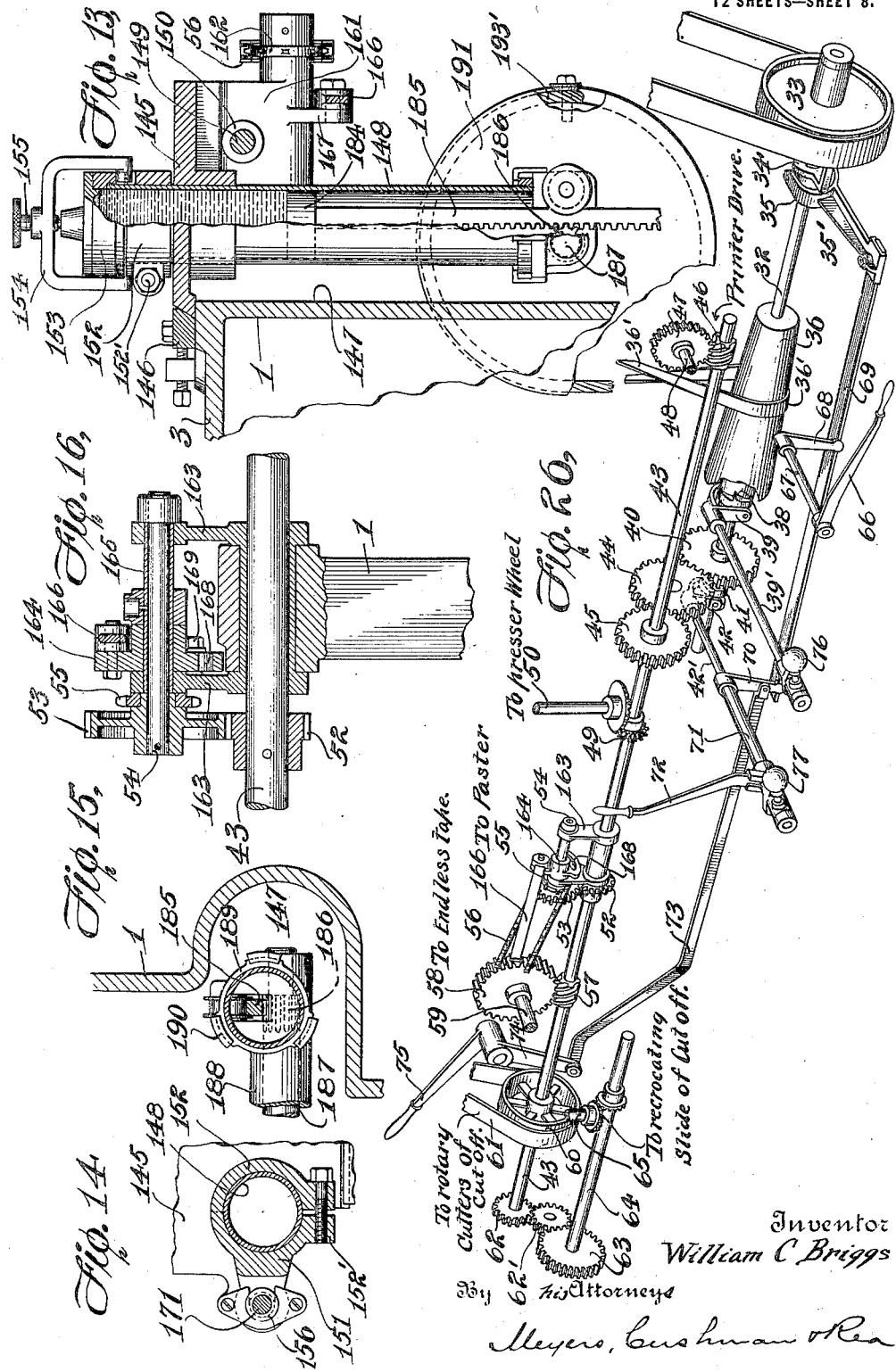

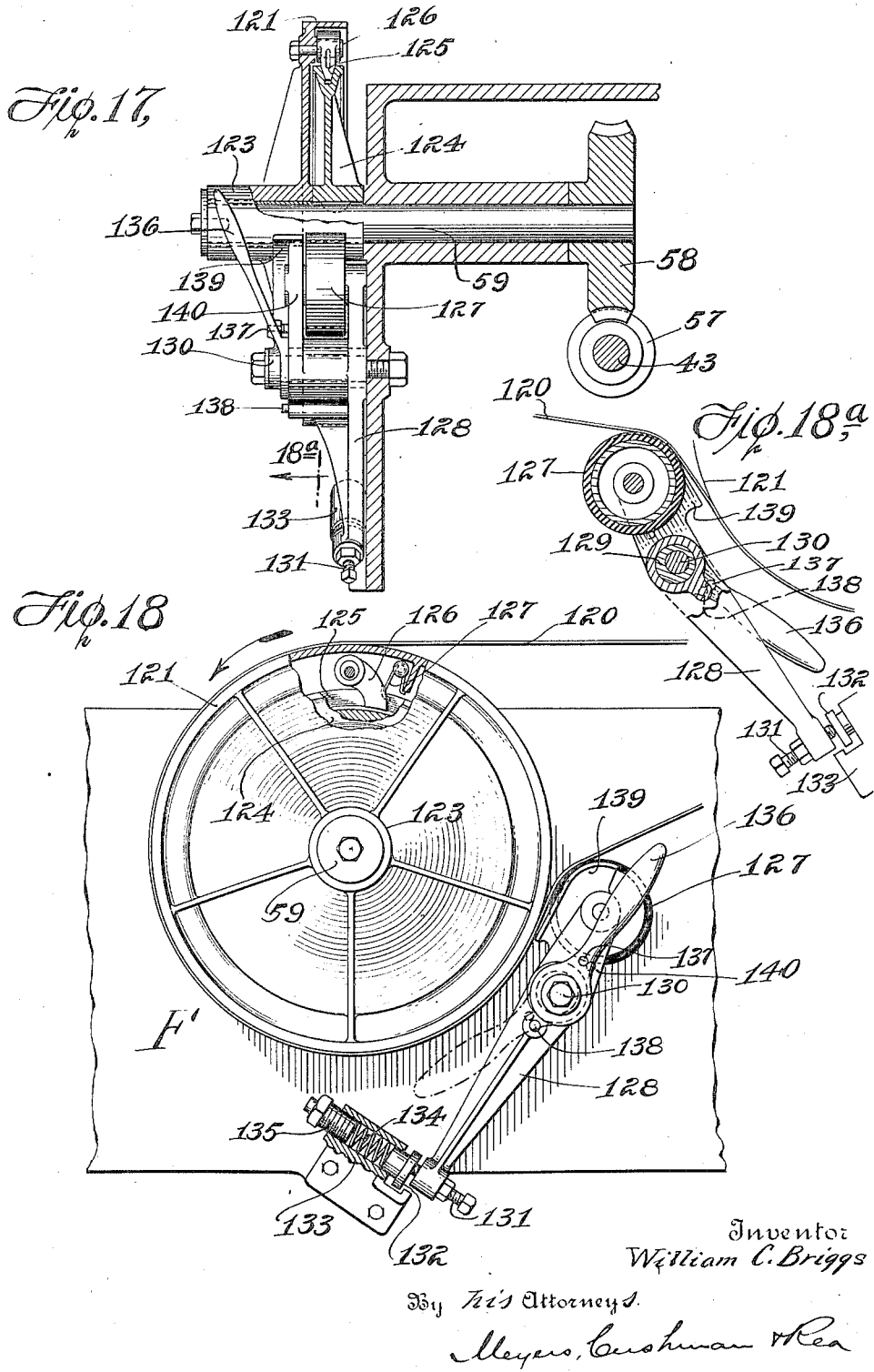

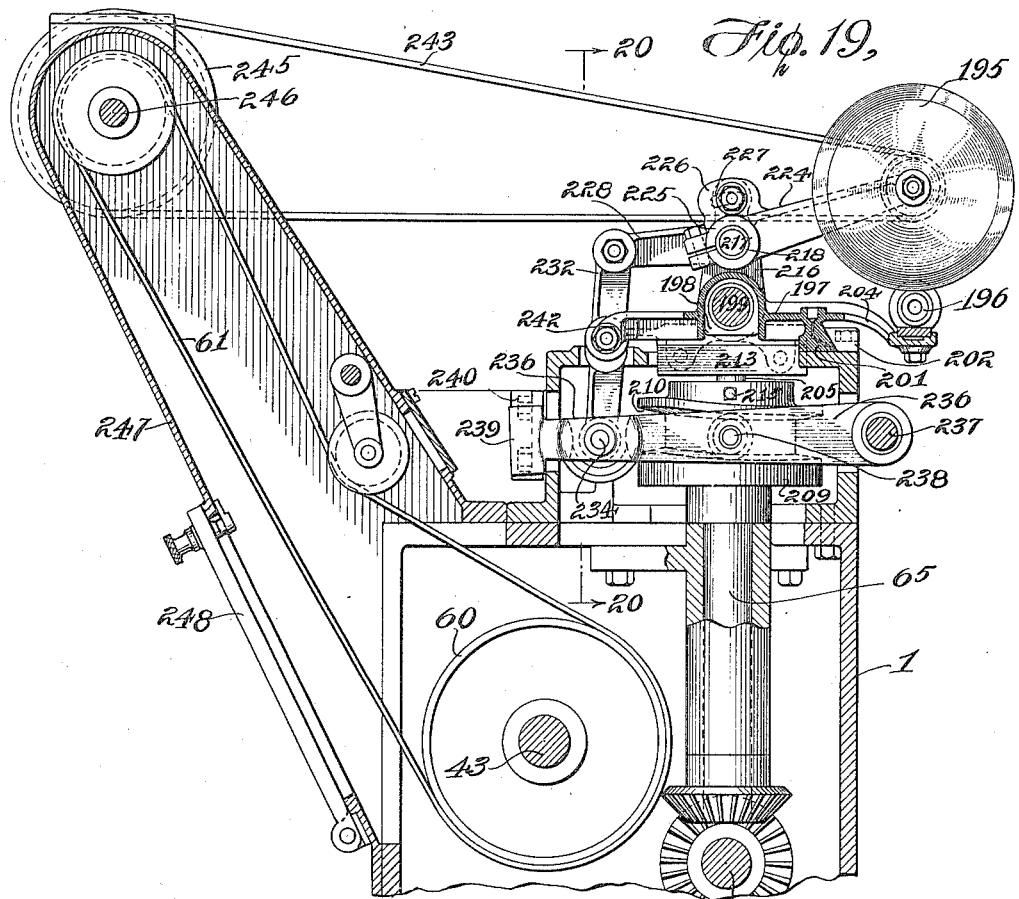
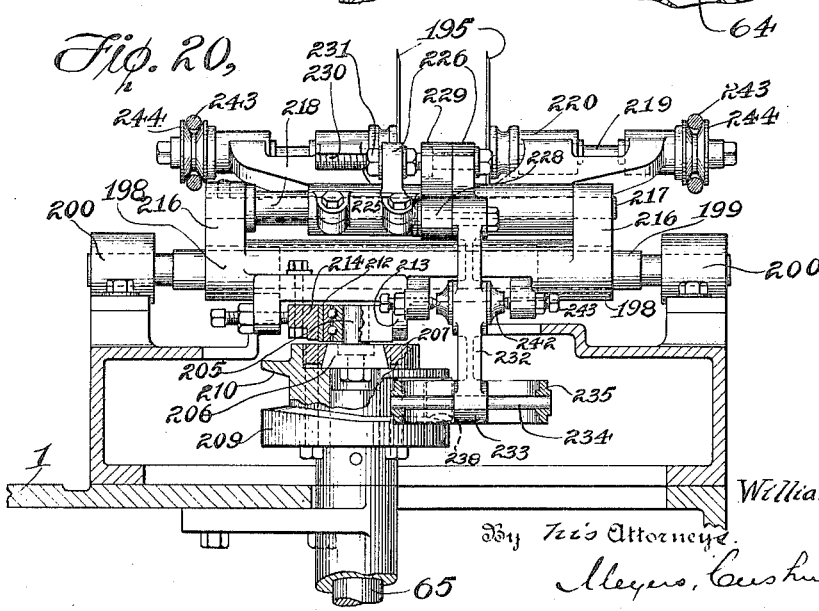

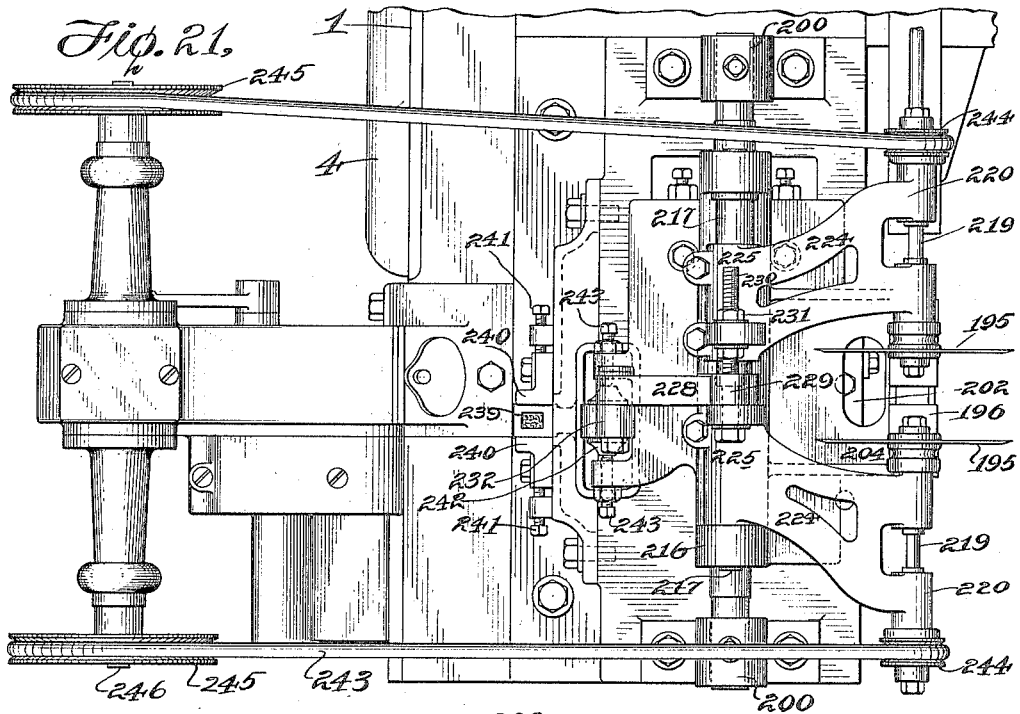
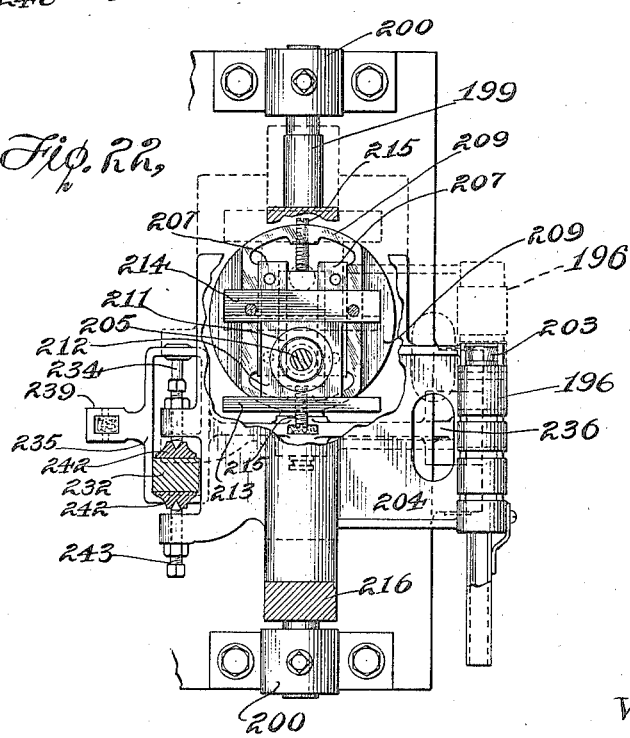

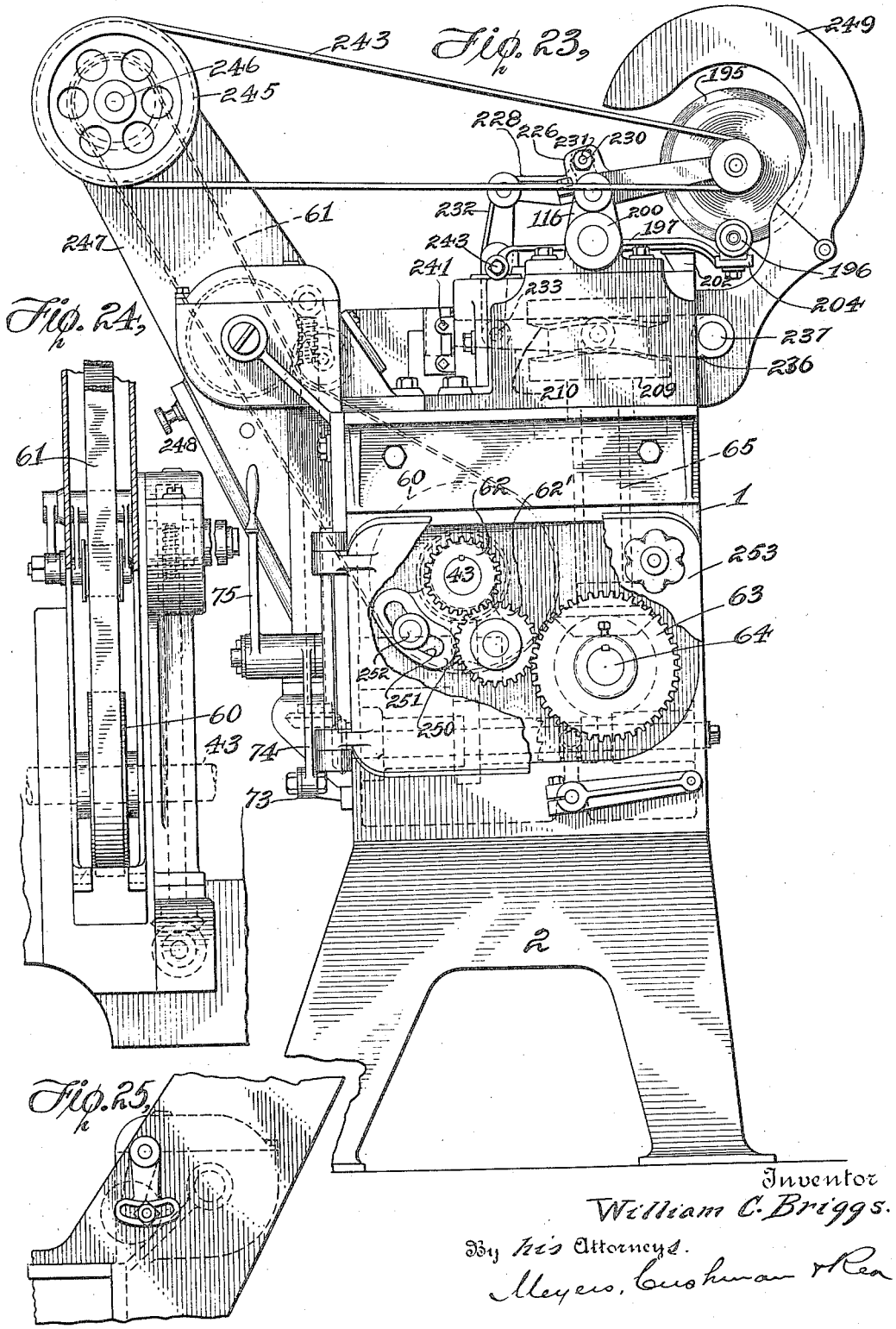

WILLIAM C. BRIGGS, OF LYNCHBURG, VIRGINIA, ASSIGNOR TO UNITED CIGARETTE MACHINE CO., INC., OF LYNCHBURG, VIRGINIA, A CORPORATION OF VIRGINIA.

CONTINUOUS-ROD CIGARETTE-MACHINE.

1,228,525. Specification of Letters Patent. Patented June 5, 1917.

Application filed October 17, 1916. Serial No. 126,098.

*To all whom it may concern:*

Be it known that I, WILLIAM C. BRIGGS, a citizen of the United States, residing at 1620 Grace street, Lynchburg, in the county of Campbell and State of Virginia, have invented certain new and useful Improvements in Continuous - Rod Cigarette - Machines, of which the following is a specification.

My present invention relates generally to cigarette machines of the well-known "continuous-rod type" and more particularly to machines of this type capable of running at a very high speed and the objects of the invention are to improve and simplify the general construction and design of the machine as a whole, as well as the coöperative mechanisms constituting the several mechanical departments thereof which are employed in carrying out the various necessary operations required in the production of the finished product in larger quantities.

My invention, therefore, includes among others, improvements in the general construction and design of the main frame of the machine which carries the various mechanisms including improvements in the automatic tobacco feeding mechanism; the preliminary tobacco filler-forming mechanism; the endless tape cigarette-rod advancing mechanism; the pasting mechanism; the cigarette cut-off mechanism; and the driving or power transmitting and controlling mechanisms which drive the various mechanical departments of the machine and permit of the throwing of these mechanisms in or out of operation independent of one another.

One of the prime objects of the present invention is to improve the general construction, arrangement and coöperative relation of the several mechanisms comprised in the different mechanical departments of the machine to the end that the various parts of these mechanisms and especially the operative or movable parts may be more readily assembled in their respective coöperative positions; may be more easily and quickly removed for replacement or repair, and more smooth running and quiet in operation, all of which are factors of great importance in machines of the high speed type such as the machine of the present invention.

In order to enable others skilled in the art to understand, build and operate machines embodying the features of the present invention, I will now proceed to describe in detail the various improvements which are illustrated in the accompanying drawings, and wherein;

Figure 1, is a plan view of a cigarette machine built in accordance with the invention, the upper part of the automatic tobacco feed being removed and certain parts thereof being shown in section.

Fig. 2, is a rear elevation of the machine, the automatic tobacco feed being removed.

Figs. 3 and 4 taken together illustrate a complete machine in front elevation.

Fig. 5 is an end elevation of the automatic feed, showing the driving mechanism for the various feed rolls and tobacco conveying aprons.

Fig. 5ª, is an end elevation of portions of the machine frame and the frame of the automatic feed showing how the latter is removably mounted and supported upon the former, the various driving mechanisms being omitted for clearness.

Fig. 6 is a vertical sectional view taken centrally through the tobacco feed hopper and delivery chute.

Fig. 7 is a transverse sectional plan view of the tobacco feed trough forming a part of the tobacco feeding mechanism.

Fig. 8 is a rear end elevation of the automatic tobacco feed showing other portions of the driving mechanism for the feed rolls and endless aprons.

Fig. 9 is a vertical cross sectional elevation of the pasting mechanism.

Fig. 10 is a plan view of the same.

Fig. 11 is a detail sectional view of a part of the pasting mechanism.

Fig. 12 is an elevation partly in section of a part associated with the pasting mechanism.

Fig. 13 is a rear view of the pasting mechanism, certain parts being shown in section.

Fig. 14 is a transverse section taken on the line 14—14 of Fig. 9.

Fig. 15 is a section taken on the line 15—15 of Fig. 9.

Fig. 16 is a section in elevation of a portion of the driving means for the paster mechanism.

Fig. 17 is an end elevation partly in section of the endless cigarette rod carrying tape.

Fig. 18 is a front elevation of the same partly in section.

Fig. 18ª is a vertical section on the line 18ª Fig. 17.

Fig. 19 is a vertical sectional view of the cut-off mechanism, certain parts being shown in elevation.

Fig. 20 is a rear view partly in section of the cut-off mechanism.

Fig. 21 is a top plan view of the cut-off mechanism.

Fig. 22 is a detail sectional view of the means for reciprocating the carriage of the cut-off mechanism.

Fig. 23 is a rear end view of the machine showing the cut-off mechanism in elevation, a portion of the machine being broken away to show certain of the driving elements.

Fig. 24 is a rear elevation of the driving means for the cutters.

Fig. 25 is a detail view in elevation of the belt tightening means of the cutter drive.

Fig. 26 is a perspective layout of the main driving mechanism and shifter means for the various mechanical departments of the machine.

According to the plan of operation of the machine the paper wrapper-strip or web for the tobacco filler rod is mounted upon a reel located at the front or feed end of the machine. This web of wrapping paper is first passed through the printing mechanism designated generally by the letter A in order to print thereon the trade mark brand of the cigarette being manufactured by the machine. The web is then run through a trough-guide designated generally by the letter B, the said trough-guide being carried by and formed as a part of the frame-work of the automatic tobacco feed the latter being designated generally by the letter C. The tobacco from the automatic feed is showered into the trough-guide directly upon the flat web of wrapper-paper moving therethrough preliminary to forming the strand of tobacco into a properly compacted filler-rod and rolling the web thereabout. The moving paper web with the tobacco strand lying thereupon is then drawn through a forming tube or channel of usual construction and of any desired cross-section, designated generally by the letter D, which operates to first form the paper web into U form, then turn one edge of the web over upon the tobacco filler leaving the other edge upstanding to receive a line of paste by a pasting mechanism indicated generally by letter E, after which the pasted edge of the web is turned over upon the already rolled but unpasted edge to form the pasted seam of the cigarette rod, the pasted and smoothly finished rod passing out of the closed end of the tube or former, as is usual in machines of this type. An endless tape cigarette rod advancing mechanism designated generally by the letter F, passes through the tube or former and assists in rolling the wrapper and drawing the wrapped cigarette rod therethrough. The finished cigarette rod after leaving the tube or former, is delivered to a cut-off mechanism indicated generally by the letter G, whereby the rod is cut into individual cigarettes of suitable length, the said cut-off mechanism in the present instance comprising a pair of cutters which operate to cut off two cigarettes at each operation of the cutters in order to increase the capacity of the machine. From the cut-off mechanism the cigarettes are delivered to any preferred form of receiving receptacle (not shown), after which they are packed into boxes or other containers for the market.

In the following detailed description, I will describe the various mechanical departments of the machine in the order last above referred to, describing the operation of each of the said mechanisms along with the description of the construction thereof so that the operation of the entire machine may be readily understood.

The frame of the machine is preferably constructed in the form of a closed housing 1, supported upon feet or legs 2 and the various mechanical departments of the machine are mounted upon the top plate 3 of said housing. Much of the gearing of the machine is inclosed within the housing 1, and is therefore protected from accumulations of tobacco dust and particles. Access may be had to the interior of the housing through suitable doors 4 located in the front and rear walls thereof, as more clearly shown in Figs. 1, 2, 3, and 4.

The tobacco feeding mechanism is of the automatic type and is built as a separate independent unit adapted to be mounted upon and secured to the main frame or housing 1 of the machine, the said housing, as well as the metal framework of the feeding mechanism being peculiarly constructed in a novel way so that the parts may be easily and quickly alined and assembled in proper fixed relation one with the other and in coöperative relation with other parts of the machine.

In the preferred construction the feeder comprises a tobacco hopper 5, carried by a pair of metal side frames or castings 6, each of which has a downwardly extending-supporting leg 7, the lower end of which rests upon a ledge or shelf 8, preferably formed on each of the two feet 2 of the housing, at the rear feed end of the machine, as more clearly shown in Fig. 5ª. The under face of each of the side frames or castings 6 is planed or milled so as to rest squarely upon the top plate 3 of the machine frame or housing 1, a locking key 9, Fig. 5, together with suitably disposed bolts being employed in conjunction with the said supporting legs 7 to hold the tobacco feeding mechanism securely in position. The construction described permits of the automatic feed being built as a separate unit and then placed in direct association with the main frame or housing of the machine whereby a more compact and rigid structure is provided.

The trough-guide B through which the paper wrapper-strip or web X passes, and onto which the tobacco from the feed hopper 5 is showered, is attached to and forms a part of the tobacco feed, as more clearly shown in Figs. 3, 5, 6 and 8. This trough-guide comprises in the instance shown a metal bed piece 10, preferably of angular formation in cross-section suitably secured at its opposite ends to the two side frames or castings 6, the upper face of the bed-piece being provided with a longitudinally extending groove 12 through which the wrapper-strip or web X travels continuously during the operation of the machine. The trough-guide has a fixed rear wall 13 bolted to the bed piece 10 and an upwardly and longitudinally movable front wall 14, the latter being pivotally connected to a pair of oscillating arms having a parallel motion, as more clearly shown in Figs. 3 and 7. The arms 15 are each mounted on a stud 16 arranged at opposite ends of the trough-guide, one of which studs has a crank arm 17 connected by a link 18 to a similar crank arm 19 secured to a rock shaft 20, the outer end of the said shaft 20 being provided with an operating handle 21 exposed at the front of the machine by means of which the said movable front wall may be shifted bodily longitudinally to raised or lowered position for the purpose of gaining access to the interior of the trough guide when desired.

Within the hopper 5 are the usual carding rolls 22 and 23 as well as the usual pin roll 24 and rotating paddle 25; the said pin roll and paddle being arranged in coöperative relation with the carding roll 22, as more clearly shown in Fig. 6. The carding roll 22 is rotated continuously while its associated carding roll 23 is rotated intermittently. The bottom of the rear portion of the hopper is formed by means of a forwardly traveling endless belt 26 which acts to continuously advance the bulk or mass of tobacco toward the carding roll 22. Another forwardly advancing endless belt 27 constitutes the bottom for the forward portion of the hopper and the tobacco from the carding rolls is showered upon this endless belt 27 in the form of a thin uniform layer which is continuously delivered between two pin rolls 28—29, located directly above the tobacco chute 30, which leads into the trough-guide and onto the web or wrapper strip X as it is drawn therethrough, to provide a continuous and uniform strand of tobacco, which is afterward formed into a continuous rod with the paper wrapper-strip rolled thereabout, as will hereinafter more clearly appear.

The endless belt 27 upon which the tobacco is showered from the carding rolls is relatively short as compared with previously existing constructions of this kind and by thus shortening this belt I have not only provided a more compact structure but I find that I am able to obtain a better and more uniform strand of tobacco in the trough-guide because the thin layer of tobacco that is continuously formed upon the belt and which is of relatively small area does not have the same opportunity to become affected by atmospheric conditions, as is the case where a relatively long belt is employed.

In previously existing automatic tobacco feeds employing carding rolls such as herein shown and described there has always been a tendency, during the operation of the machine, for the mass of tobacco in the hopper to build up or accumulate adjacent the intermittently rotating carding roll 23, and this built up or accumulated mass has a tendency to separate or divide within the mass at a point adjacent the bight of the two carding rolls and thus form what has generally been termed an "air pocket" in the tobacco mass, and this is especially true when the hopper is full or substantially full of tobacco. The formation of these so-called "air pockets" very materially interferes with the feeding operation, resulting in alternate thin and heavy deposits of tobacco upon the belt 27 and correspondingly thin and heavy portions of tobacco in the make-up of the tobacco strand as it is formed in the trough-guide, with the ultimate result that imperfect and unsatisfactory cigarettes are formed, some being too hard for smoking purposes and others being too soft.

To obviate this difficulty existing in prior known constructions of automatic feeds, I have provided in the tobacco hopper 5 adjacent the intermittently rotating carding wheel 23 a pin roll 31, which roll is geared up to be rotated at a greater speed than the speed of rotation of the continuously rotating carding roll 22 and in a direction opposite the direction of rotation of the roll 23 but in the same direction of rotation as the roll 22. This roll 31, when the hopper is full, or substantially full of tobacco, rotates continuously in the tobacco mass and prevents the mass from swelling up and thus forming "air pockets" at the point adjacent the bight of the two rolls 22—23, and therefore gives a more uniform feed of tobacco at all times, thus obviating the difficulties hereinbefore mentioned. The roll 31 is preferably mounted so as to be adjusted vertically whereby it may be set in proper position to effect the desired object.

The employment of this pin roll 31 in conjunction with the usual carding rolls of an automatic tobacco feed I consider to be an important novel feature of the present invention.

*Power transmitting and controlling mechanism.*

I will now proceed to describe the driving and power transmitting mechanisms which drive the various mechanical departments of the machine, including the tobacco feeding mechanism, reference being made more particularly to Fig. 26, which shows much of the main driving shafts and gears and their relative arrangements.

The main power shaft 32 which is mounted in suitable bearings shown as carried by the depending legs 7 of the frame of the automatic tobacco feed as illustrated in Figs. 6 and 8, has a pulley 33 loose thereon, a clutch 34 being employed between the shaft and its pulley, said clutch being operated by a shipper 35 mounted upon an arm 35' extending therefrom, by means of which the clutch may be thrown into and out of clutching action. Mounted loosely upon shaft 32 is a cone pulley 36 which is belted by means of a crossed belt 36' to another but oppositely coned pulley 37 journaled in bearings carried by rocker arms 38', as more clearly shown in Fig. 6. The cone pulley drives the various belts, carding and other rolls forming parts of the automatic tobacco feed in a manner presently to be described. The cone pulley 36 which is loosely mounted upon the shaft 32 may be clutched thereto so as to rotate therewith by means of a clutch 38 which is controlled by a shipper 39 carried upon a rock shaft 39'. The shaft 32 also carries a loose gear 40 which may be clutched thereto so as to rotate with the shaft by means of a clutch 41 controlled by a shipper 42 mounted upon a rock shaft 42'. The gear 40 drives a counter-shaft 32 through the medium of a gear 44 meshing with a similar gear 45, which latter is secured to said counter-shaft and this countershaft is the medium through which other mechanical departments of the machine derive their motion. For instance, at one end of the counter-shaft there is a worm 46 meshing with a worm-gear 47, the shaft 48 of which drives the printing mechanism A. There is also on the shaft 43 a beveled gear 49 which meshes with a similar beveled gear mounted upon a shaft 50, which shaft is suitably geared to drive a presser wheel 51, Fig. 3, situated at the discharge end of the trough-guide B, said presser wheel 51 being preferably concave at its periphery so as to act upon and preliminarily compact the strand of tobacco as it issues from the trough-guide and travels toward the folding tube or channel D. The presser wheel 51 is secured to a shaft 51ª journaled in a swinging bracket 51ᵇ, Fig. 1.

The shaft 43 also carries a gear 52 meshing with another gear 53 mounted upon a counter-shaft 54, Fig. 16, there being a sprocket wheel 55 secured to a hub of the shaft 54 which drives a sprocket chain 56 leading to the paster mechanism presently to be described. The shaft 43 also carries a worm 57 in mesh with the worm-gear 58 mounted upon a shaft 59 which latter drives the endless tape mechanism F presently to be described, and there is also mounted upon shaft 43 a pulley 60 which drives, through the medium of a belt 61, the rotary cutters of the cut-off mechanism presently to be described in detail. At the extreme end of the shaft 43 there is a gear 62 in gear connection through gear 62' with a larger change gear 63 removably mounted upon a counter-shaft 64 which counter-shaft is in gear-connection with a vertically extending shaft 65 for imparting motion to the reciprocating carriage of the cut-off mechanism, all of which will presently be described more in detail.

It will be seen from the foregoing that all of the various mechanical departments of the machine are driven from the main shaft 32, and that by reason of the clutch controlled connections leading to the driving means, some of the moving parts of the different mechanical departments of the machine may be thrown into or out of operation without affecting the operation of the others. For instance, by throwing in the clutch 38 and throwing out the clutch 41, the tobacco feeding mechanism may be operated independently of any of the other mechanisms. By throwing in the clutch 41 and throwing out the clutch 38 the tobacco feed mechanism may be thrown out of operation and the other mechanical departments of the machine brought into operation. Such an arrangement is of material advantage in a machine of this kind, especially when the machine is being tuned up for operation, it being necessary at this time to accurately adjust the tobacco feed as well as the other machine departments.

In order to stop and start the machine from various points thereof, and at the same time be able to throw the different clutches into and out of operation, I have provided operating handles located at different places throughout the machine for ready and quick manipulation. One such handle, 66, is arranged at the front of the machine adjacent or directly opposite the automatic feed, said handle being mounted upon a shaft 67 to which an arm 68 is attached, said arm being in engagement with a longitudinally movable bar 69 the end of which is attached to the arm 35' that controls the clutch 34 between the main driving shaft and the loose pulley 32. The longitudinally moving bar 69 is also connected to an arm 70 mounted upon a sleeve 71 loose upon the shaft 42' there being a handle 72 connected to said sleeve whereby the clutch 34 may be operated from a point about midway of the length of the machine, as more clearly shown in Figs. 4 and 26. A long link 73 is connected at one end of the arm 70 and at its other end is pivoted to an arm 74 forming a part of the handle member 75 located at the extreme or delivery end of the machine, so that the cigarette "catcher" so-called, may stop the machine quickly in case of an emergency.

The shipper 39 mounted upon the rock shaft 39' and which shipper controls the clutch 38 of the cone pulley 36 may be thrown into or out of operation by means of a weighted arm 76 mounted upon the end of the shaft 39. Rocking of this weighted arm 76 shifts the clutch 38 into locked or unlocked position, and holds the same in such position by gravity of the weight. A similar weighted arm 77 is mounted upon the end of the shaft 42' for controlling the clutch 41. These weighted arms 76 and 77 are conveniently located at the front end of the machine directly opposite the automatic feeding mechanism as more clearly shown in Fig. 3, and may be easily operated by the hand or foot of the operator, and lifted or kicked to the desired position.

It is necessary in automatic tobacco feeds to adjust or regulate the amount of tobacco that is fed into the trough-guide B in order to make a filler-rod of the requisite density for smoking purposes. To effect adjustment of the tobacco feed, I have provided a convenient and readily accessible means for changing the speed of rotation of the various carding and pin rolls located in the tobacco feed hopper. This is accomplished by shifting the crossed driving belt 36' leading from the cone pulley 36 to the cone pulley 37 to different positions longitudinally to the cone pulleys to vary speed of rotation of the cone pulley 37. For this purpose I employ a movable belt shipper in the form of an arm 78 having at its opposite ends bifurcated portions 79 which respectively straddle opposite runs of the belt 36', to shift the belt longitudinally of the cone pulleys 36 and 37.

The shipper arm 78 is mounted upon a threaded shaft 80, Figs. 2 and 6, said shaft having secured thereto a worm wheel 81 with which a worm gear 82 meshes, said worm gear being mounted upon a shaft 83 upon the outer end of which there is an operating handle 84 by turning which the shipper arm 80 may be readily adjusted longitudinally to bring about the proper speed rotation of the rotary elements of the tobacco feeding mechanism.

The crossed belt 36' may be properly tensioned upon its cone pulleys 36 and 37 by rocking movement of the arms 38 in which the cone pulley 37 is journaled. Rocking movement of the said arms 38 is effected through the medium of a shaft 85 having engagement at one end with one of the arms 38', said shaft 85 being provided at its outer end with an operating handle 86, the said handle 86 as well as the handle 84 being disposed at the front of the machine, as more clearly shown in Fig. 3, where they will be in convenient reach of the machine attendant or operator.

I will now proceed to describe the driving mechanism for the various carding rolls, pin rolls, endless belts and other moving parts of the tobacco feed mechanism, reference being had more particularly to Figs. 2, 5, 6 and 8, it being understood that these parts are driven from the cone pulley 37. The shaft upon which the cone pulley is mounted is provided at one end with a gear 87, Fig. 2, meshing with a gear 88 mounted upon a short shaft 89 having a sprocket wheel 90 on one end. The gear 88 is in mesh with another gear 91 mounted upon a short shaft on which there is also mounted a sprocket 92, Fig. 2. The sprocket 90 drives a sprocket chain 93 which in turn drives a sprocket 94, the shaft of which has an eccentric connection with a pawl 95 to give said pawl an intermittent thrust movement. This pawl is in engagement with a ratchet wheel 96 mounted upon the shaft carrying the carding roll 23, and by means of which the said carding roll is given an intermittent movement, as more clearly shown in Fig. 5. The shaft upon which the sprocket 94 is mounted carries a pinion 97 which drives a gearwheel 98 which in turn drives a larger gear 99, upon the shaft of which the carding roll 22 is mounted so that said roll has a continuous rotary motion imparted thereto. The sprocket wheel 92 which is located on the same end of the feed hopper as the sprocket 90 drives a sprocket chain 100, which in turn drives the pin wheel 24 and paddle or fan wheel 25, this driving mechanism being so clearly shown in Fig. 5 as not to need further detailed description.

The various driving gears and sprockets as well as the associated sprocket chains just described are mounted upon the side of the tobacco feed hopper 5 at the extreme front end of the machine as more clearly shown in Fig. 5. Other driving gears and sprockets are mounted upon the other side of the tobacco feed hopper 5 as more clearly shown in Fig. 8, to which figure attention is now directed wherein it will be seen that the shaft on which the carding roll 22 is mounted is provided with a sprocket wheel 101 about which a sprocket chain 102 is passed, said sprocket also passing about a sprocket 103 upon the shaft of which there is a drum 104, Fig. 6, about which the tobacco feed belt 27 runs, this being the power means for said belt. The chain 102 also passes about a sprocket 105, Fig. 8, which drives the pin roll 28 situated above the hopper 30 leading to the trough-guide B. It will be seen therefore, that the tobacco delivery belt 27 and the pin wheel 28 are driven through the medium of the sprocket chain 102 from the shaft on which the pin roll 22 is mounted. The belt 26 constituting the bottom of the hopper 5 and which supports the mass of tobacco in the hopper, is driven from the shaft upon which the pin wheel 22 is mounted through the medium of a sprocket chain 106, as more clearly shown in Fig. 8.

On one end of the shaft carrying the pin roll 24 is mounted a pulley 107, Fig. 8, about which and another pulley 108 there is a crossed belt 109, the said pulley 108 being mounted upon a shaft which carries a clearer, or wiper, 110, arranged in coöperative relation with the carding teeth of the intermittently rotating carding wheel 23, as more clearly shown in Fig. 6. On this same shaft there is a small pulley 112, geared by means of a belt 113 to a larger pulley 114 mounted on one end of the shaft which carries the pin roll 31, which roll operates to prevent the formation of so-called "air pockets" in the mass of tobacco in the hopper 5, as heretofore described. The said roll 31 with its pulley 114 are mounted in vertically adjustable bracket arms 115 so that the roll 31 may be adjusted to proper position with relation to its associated carding rolls to bring about the desired operation. It will be seen by referring to the driving means for the roll 31, that said roll is driven at a speed greater than the speed of rotation of the carding roll 22.

The folding tube or folder D through which the paper wrapper-strip with the tobacco filler-rod passes, and which operates to roll the wrapper-strip around the filler-rod, may be of any desired shape in cross-section to make either round, oval or other shaped cigarettes. This tube or folder consists of the usual bed or channel section 116, tongue 117, removable top block 118, and removable setting or finishing block 119, which latter is situated at the end of the tube or folder and operates to finally set and smooth the sealed seam of the cigarette rod as it emerges therefrom. The folding tube or channel is mounted upon the bed plate 3 of the machine in line with the trough-guide B, so that the paper wrapper-strip X with its strand of tobacco as they issue from the trough-guide move directly through the folding tube or channel to have the wrapper-strip rolled about the filler-rod of tobacco.

*Endless tape mechanism.*

In cigarette machines of the continuous-rod type as now generally constructed, there is included an endless tape mechanism which passes through the folder tube and assists in rolling the paper wrapper-strip about the tobacco filler and also serves to continuously advance the rod through the folder. This endless tape mechanism is shown more clearly in Figs. 4, 17, and 18, wherein the endless tape is designated by the numeral 120. It is held in frictional engagement with the periphery of a traveling tape-supporting rim 121 of considerable diameter and also travels about a small pulley or sleeve 122 located adjacent the mouth of the tube or folder as more clearly shown in Fig. 4. The tape supporting rim 121 is carried by a hub 123 loosely mounted upon the shaft 59 as heretofore described Figs. 17 and 26, so as to be capable of rotation independently of such shaft. Splined or keyed to the shaft 59 is a disk 124 having a V-shaped groove 125 in its periphery. The tape supporting rim is provided with a dog 126 which is pivoted thereto and which has a beveled end, as more clearly shown in Fig. 17, which engages the V-shaped groove in the disk 124, a spring 127, Fig. 18, serving to normally urge the said dog into gripping contact with the walls of the V-shaped groove in the disk. The shaft 59 is driven from the worm 57 on the shaft 43, which worm is in gear with the worm-gear 58, as previously described. It is desirable at times to cause an advancing movement of the endless tape 120 otherwise than through power from the machine, and by reason of the construction shown wherein a tape supporting rim is employed capable of movement independent of the positive driving means shown, the endless tape may be drawn through the tube or folder by simply rotating the tape supporting rim by hand, in which case the dog 126 will simply ride through the V-shaped groove 125 formed in the periphery of the disk 124.

It is necessary of course to exert sufficient tension upon the tape 120 to cause the same to remain in gripping contact with the tape supporting rim 121, whereby the tape will be continuously advanced through the tube or folder. To properly tension the tape I have provided an improved tensioning device which is more clearly shown in Figs. 4, 17 and 18, and which in the instance shown consists of a rubber-faced tightener wheel 127 rotatingly mounted at the end of an arm 128 which arm is loosely supported upon an eccentric 129 loose upon a stud 130, as more clearly shown in Figs. 17, 18 and 18A. At its lower end the arm 128 carries a set screw 131 arranged in line with the head of a yieldable plunger 132 supported in a casing 133, said plunger being normally urged outward into contact with the set screw 131 by means of a coil spring 134, the tension of which may be adjusted by means of an adjustable screw 135, in threaded engagement with the bore of the casing 133. The spring actuated plunger 132 tends normally to exert an outward influence upon the lower end of the lever 128 which in turn urges the tape tightening wheel 127 into gripping contact with the periphery of the tape-supporting rim 121 to tighten the same, while at the same time permitting the tape to travel. When it is desired to loosen the endless tape for any purpose or to remove the same, or to apply a new tape, the eccentric 129 which carries a hand lever 136, Fig. 18, is swung to the left until an outwardly extending stop pin 137 carried thereby is brought into contact with a stop pin 138 on the arm 128 whereupon the tightening wheel 127 will move outward away from the periphery of the rim 121, resulting in loosening of the endless tape. The degree of tension of the tape 120 may be regulated and set by means of the set screw 131, and when the arm carrying the tension wheel 127 is shifted by the eccentric 129 to loosen the tape and then brought back again to tightening position, it will always come back to the same position to which it was originally set, no matter how often the arm may be shifted.

In order to assist in applying the endless tape to the tightener wheel 127, I provide a tape-placing-guide consisting of a curved face plate 139, mounted upon a bracket arm 140 formed integral with arm 128, the said tape-placing-guide having a curved portion in substantial alinement with the periphery of the tightener wheel 127 and a straight portion extending below and across the periphery of the tightener wheel, as more clearly shown in Fig. 18. The said tape-placing-guide lying as it does adjacent the periphery of the tightener wheel 127 serves as a convenient support for the endless tape 120 and as a placing and guiding face to guide the tape over the tightener wheel 127 after it has been placed over the tape-supporting rim 121 and the tape may therefore be quickly and smoothly applied in position.

Another tape tightening wheel 140' is employed and acts upon an intermediate portion of that run of the tape extending between the tightener wheel 127 and the sleeve or pulley 122 as more clearly shown in Fig. 4. The tightener wheel 140 is carried by an adjustable bracket 141 mounted upon a stud 142, the said bracket having a curved slot 143, a handled locking bolt 144 being provided to lock the wheel 140 in any desired adjustable position to guide and tension the endless tape 120.

*Paster mechanism.*

The paster mechanism is more clearly shown in Figs. 9 to 16 inclusive, to which figures attention is now directed. This mechanism is carried by a horizontally adjustable slide-plate 145 mounted to slide between guide strips 146, secured to the top plate 3 of the machine frame, the said slide plate 145 overlying a recess 147, Fig. 15, formed by curving inwardly a portion of the front wall of the machine frame or housing, the said recess being provided to receive and permit of adjustment therein of the paste supply tube or cylinder 148. The slide 145 may be adjusted by means of a threaded shaft 149, Figs. 9 and 10, which shaft has threaded engagement with a lug 150 formed integral with the machine frame. This plate 145 carries a head 151 at its front edge, provided with a split clamp 152, having a closing screw 152', Figs. 9, 13 and 14 through which clamp the paste tube or cylinder 148 extends and by which it is supported in proper vertically adjusted position. The paste tube or cylinder 148 is provided at its upper end with a removable cap 153 which may be secured in position by means of a swinging yoke 154 carrying a screw 155 the end of which may be screwed into locking engagement with a stud projecting upward from the top of the cap as more clearly shown in Figs. 9 and 13. The tube or cylinder may be readily filled with paste when the cap 153 is removed and without removing the paste tube or cylinder from its clamped connection with the slide plate.

The head 151 has journaled at the front end thereof a vertically extending rotary sleeve 156 to the lower end of which is secured a bevel gear 157, said sleeve also carrying a transversely arranged key 158, Fig. 11, the key extending across a cut-away portion of the sleeve 156. The bevel gear 157 together with its sleeve 156 is positively rotated through the medium of a bevel gear 159 mounted upon a horizontal shaft 160 journaled in a bearing formed in a depending bracket portion 161 of the head 151. The shaft 160 carries a sprocket wheel 162 with which the sprocket chain 56 leading from the sprocket wheel 55 is in gear, so that the sleeve 156 and its associated paster disk presently to be described, derives its rotary movement through the sprocket chain 56 from the sprocket wheel 55 which in turn is driven from the power shaft 43.

In order to be able to take up any slack in the sprocket chain 56 due to wear or stretch of the chain and thus take care of any undue lost motion in the parts, I have provided a special construction which I have found to be very advantageous in the particular combination in which it is employed, and this improved construction is more clearly shown in Figs. 9, 10, 15 and 26 wherein it will be seen that the shaft 54 upon which the sprocket wheel 55 is mounted, is journaled in a yoke frame consisting in the instance shown of a pair of arms journaled for swinging or axial adjustment about the shaft 43 so that during adjustment of said arms the gear wheel 53 which is carried by shaft 54 will remain in mesh with the gear 52 about which it moves during adjustment. In order that the arms 163 together with the shaft 54 and its gear 53, as well as the sprocket 55, may be fixed in adjusted position to effect proper tightening of the sprocket chain 56, there is provided a slotted bracket 164 loosely mounted upon a sleeve 165 extending between the arms 163. The slotted bracket is connected by means of a link 166 to a fixed stud 167 depending from the bracket 161 carried by the slide 145 as more clearly shown in Figs. 9, 13 and 26. The bracket 164 is provided with a curved slot 168 which overlies one of the arms 163 and which may be secured thereto when in proper adjusted position by means of a set bolt 169 so that in effect the bracket 164 and the arms of the yoke 163 become as a single rigid member although the parts thereof are adjustable relative to one another in order to enable the sprocket wheel 55 to be adjusted toward and from sprocket wheel 162 to take up lost motion in the sprocket chain 56.

The means for applying the paste to the edge of the strip of wrapper-paper during the passage of the same through the tube or folder, consists of a horizontally arranged disk 170 mounted upon a rotatable stem 171 which stem is removably and slidably keyed in the rotating sleeve 56 as more clearly shown in Figs. 9 and 11. The lower end of the stem 171 is cut away at 172 so that said cut away end may fit against and be brought into locking engagement with a wall of the key 158 carried by the rotating sleeve, so that rotary movement of the sleeve is imparted to the stem to cause rotation of the paste applying disk 170. This paste-applying disk rotates with a portion of the periphery thereof exposed to the paste within the paste-tube or cylinder 148, as more clearly shown in Fig. 9, there being adjustable slot closure plates 173, Fig. 9, bearing upon opposite faces of the disk 170 at the point where the periphery of the disk enters the paste tube or cylinder so that as the paste disk rotates its periphery becomes coated with paste which is then transmitted to the upstanding edge of the wrapper-strip as the latter passes through the tube or folder, this pasted edge being then folded over and secured to the previously folded edge of the wrapper-strip to form the pasted seam of the cigarette rod, this operation being common in cigarette machines of the continuous-rod type. A scraper-finger 174, Fig. 10, has an edge which bears upon the periphery of the paste-applying disk 170 to scrape off surplus paste. The scraper-finger is mounted for swinging movement toward and from the periphery of the paster disk by providing the finger with a circular head 175 mounted in a circular recess formed in a plate 176 lying below the removable cap 153, a set screw 177 being employed to hold the scraper-finger in proper position relative to the disk.

In order to support the upstanding edge of the wrapper-strip upon the face opposite that to which the line of paste is applied, I have provided a rotatable backing disk 178, Figs. 9 and 12, which disk is mounted for rotation upon a stud 179 carried by a stem 180 journaled in the bore of an externally threaded sleeve 181 which sleeve is in threaded engagement with a bracket 182 carried by a part of the tube or folder. The periphery of the backing disk is normally held in yielding contact with the periphery of the paste disk 170 by means of a light coiled spring 183, as more clearly shown in Fig. 10.

The sleeve 181 in which the stem 180 of the backing disk is mounted, is relatively long so as to provide a long bearing for the stem in order to provide against any liability of the backing disk tilting or canting relative to its associated paster wheel, which tilting or canting if present would result in leading the paper wrapper-strip in other than a true rectilineal direction. This is a serious objection in other constructions where rotary devices are employed as a backing support for the upstanding edge of the paper wrapper-strip, and such objection is entirely obviated by my improved construction herein shown and described.

It is necessary of course to be able to adjust the paste-applying disk 170 as well as the backing disk 178 in order that the line of paste may be applied accurately to the extreme marginal edge of the wrapper-strip, it being understood that these wrapper-strips vary in width depending upon the diameter of the cigarettes being manufactured. By the arrangement shown and described I can adjust the paster disk by simply raising or lowering the paste tube or cylinder 148 and without affecting the driving connection with the stem of the disk. The paste tube or cylinder can be raised or lowered by simply loosening the screw 152' which controls the clamp 152, effecting proper adjustment of the tube or cylinder and then re-clamping the same by adjusting the screw 152'. The backing disk 178 may be readily and quickly adjusted while the machine is running by screwing the sleeve 181 up or down as desired, there being a milled head 181' at one end of the sleeve for this purpose.

The supply of paste within the paste tube or cylinder 148 is constantly urged or forced upward by means of a plunger 184 mounted upon the end of a rack bar 185 depending through the lower end of the tube or cylinder 148, such rack bar being in mesh with a pinion 186 mounted upon a shaft 187 journaled in a bearing 188 carried by a cap or ring 189, Figs. 9 and 15, which cap or ring has a removable bayonet joint connection 190 with the lower end of the tube or cylinder 148. A pulley 191 is loosely journaled upon the end of the shaft 187, but has a connection with said shaft through the medium of a spring actuated pawl 192 engaging the teeth of a ratchet wheel 193 fixed to the shaft 187. A cord or chain 193' is secured to the periphery of the wheel 191, a portion thereof passing about the said periphery and carrying at its free end a weight 194, which weight normally exerts a rotating force upon the wheel 191 and through the pawl 192 and ratchet 193 which force is transmitted to the shaft 187 and through the pinion 186 to the rack bar 185 to the plunger 184 and against the body of paste in the paste tube or cylinder to force the same upward toward the upper end of the tube or cylinder in which the paste disk rotates.

It will be seen that the cap or ring 189 and the other weighted parts carried thereby, are mounted directly upon the lower end of the paste tube or cylinder and that the weight of these parts normally tends to draw the paste tube or cylinder downward, or in other words, exert a force upon the tube or cylinder in opposition to the force exerted by the upwardly moving plunger 184, and I thus overcome objections incident to those constructions wherein the actuating means for a paste forcing plunger is mounted upon a fixed part of the machine frame and wherein the plunger elevating strains operate directly upon the paste tube or cylinder which make it difficult to maintain the latter in fixed adjusted position. Furthermore, by mounting the plunger-actuating means upon a cap or ring that is removably attached to the lower end of the paste tube or cylinder, these parts may be more readily manufactured and more easily and quickly assembled. The construction shown and described wherein the paster mechanism in its entirety is carried by a horizontally adjustable plate, as the plate 145, and where the frame of the machine is formed with a recessed portion to receive the paste-tube or cylinder which permits of the adjustment thereof relative to the folder tube, are all features of special construction that possess advantages not only from the standpoint of manufacture, but from the standpoint of usage by reason of the ease and rapidity with which adjustments, replacements and repairs may be made.

*Cut-off mechanism.*

As the productive capacity of the machine depends very largely, if not entirely, upon the speed and accuracy with which the cut-off mechanism is capable of cutting the finished cigarette rod into cigarette lengths, it is of the utmost importance that the cut-off mechanism shall be capable not only of running at a very high rate of speed, but that the cutters shall operate to cut the rod accurately, squarely and cleanly and it is also a desideratum of considerable importance that the mechanism operate smoothly and quietly. I have had this and other objects in view in designing the improved cut-off mechanism of the present invention, which mechanism is illustrated in Figs. 19 to 25 inclusive.

The cutters, of which two are shown in the present instance, consist of circular knives 195 which have a compound reciprocating and oscillating movement, that is a movement in a horizontal direction or in the path of travel of the cigarette rod and an oscillating movement in a somewhat vertical direction and across the path of travel of the cigarette rod as said rod moves through the cigarette guide 196. The cutters are mounted upon the reciprocating carriage 197, which carriage is provided with a pair of apertured bosses 198 through which a fixed bar 199 freely passes, said bar being secured at its opposite ends by bearing members 200 secured to the top plate of the machine frame. The bar 199 is preferably of cylindrical shape and constitutes the support for the reciprocating carriage and by reason of its shape and construction enables the carriage to be reciprocated with a minimum of friction.

At its forward edge the reciprocating carriage 197 is provided with a guide block 201 having a beveled front wall which coöperates with a correspondingly beveled wall formed at the edge of the guide strip 202 as more clearly shown in Fig. 19, these parts serving merely as a means for insuring a steady movement of the carriage during reciprocation thereof. The cigarette guide 196 which has a funnel mouth 203, Fig. 22, and which guide also carries the usual ledger plates against which the knives 195 act, is carried by a bracket 204 projecting outward from the forward edge of the carriage 197, as more clearly shown in Figs. 21 and 22, the said cigarette guide and its associated parts being removably secured to the bracket 204 in any suitable way.

The carriage upon which the cutter parts are mounted, is reciprocated through the medium of an eccentric pin 205 carried by a block 206 mounted for adjustment between clamping plates 207 having oppositely disposed beveled faces corresponding to oppositely beveled edges of the block 206, said block together with the clamping plates 207 being securely fixed in a recess formed in the upper end of a horizontal drum cam 209 mounted upon the end of the shaft 65 driven through beveled gears from the shaft 64 as previously described. The drum cam 209 is provided in its periphery with a cam-groove 210 rotating in a substantially horizontal plane, the purpose of which cam-groove will presently be described.

The eccentric pin 205 carries a ball-bearing ring 211 fitted in a plate 212 which is mounted for sliding movement between spaced guide plates 213 and 214 carried by the under side of the carriage 197, the guide plate 214 being adjustable toward and from the plate 213 in order to take up wear occurring between the parts. The block 206 which carries the eccentric pin 205 is held in adjusted position by means of the clamping plates 207 and set screws 215 as more clearly shown in Fig. 22, and by means of which the eccentric pin may be adjusted to vary the throw of the carriage. Obviously rapid rotation of the eccentric pin will result in a correspondingly rapid reciprocating motion being imparted to the carriage, which latter being supported upon and guided by the rod 199 will move rapidly, freely and quietly.

The carriage is further provided with a pair of separated upwardly extending arms 216, one such arm being arranged above each of the bosses 198, the said arms being apertured and connected or joined by means of a rod 217 which rod is surrounded by a loose sleeve 218. Each of the cutters is secured to its own shaft 219, which shafts are journaled in bearings formed at the end of the cutter-carrying arms 220, each arm being provided with a split clamp 225, which clamps are adapted to be brought into adjustable clamping engagement with the sleeve 218 surrounding the rod 217, the said rod 217 constituting a support about which the cutter arms oscillate during the movement of the cutters 195 across the path of travel of the cigarette rod as it passes through the cigarette guide 196.

Each cutter-carrying arm 224 is provided adjacent its clamp portion 225 with an upstanding wing 226, each wing having a curved slot 227. An operating arm 228 is mounted on the sleeve 218 such arm having an upstanding apertured boss 229, one face of which lies flush with the face of one of the upstanding wings 226 as more clearly shown in Figs. 20 and 21. An externally threaded rod or screw 230 extends through the slots in the upstanding wings 226 of the two cutter arms and through the aperture in the upstanding boss 229, lock nuts 231 being provided to securely lock the cutter arms 224 in adjusted position with relation to the operating arm 228 so as to cause the cutter-arms 224 to oscillate upon the rod 217 upon movement of the arm 228, the slots in the upstanding wings 226 of the cutter-arms permitting these arms to be adjusted relative to the operating arm 228 and the cutting edge of the cutters 195 toward and from the opening in the cigarette guide 196 in order that the active edge of the cutters may be properly positioned with relation to the cutter-guide.

The operating arm 228 is actuated through the medium of a vertically reciprocating link 232 pivoted at one end to said arm and provided at its lower end with an apertured boss 233, which is adapted for free sliding movement upon a pin 234 secured to and mounted between the forked arms 235 of a vertically oscillating lever 236 pivoted at 237 as more clearly shown in Fig. 19, said oscillating lever 236 carrying a roller 238 shown in dotted lines in Fig. 19 which roller is preferably of conical shape and which projects between the beveled faces of the cam-groove 210 in the drum cam 209. The free end of the lever 236 is provided with a head 239 which reciprocates between adjustable wear-plates 240, Fig. 21, which wear-plates are made adjustable toward the head 239 by means of set screws 241, the parts being constructed as described so that lost motion between the parts may be taken up from time to time. The cutter actuating link 232 is provided on opposite sides about midway its length with flat faces, which are arranged for free movement between a pair of wear disks 242, each disk being supported by a screw 243 tapped through ears carried by a part of the reciprocating carriage as more clearly shown in Figs. 20 and 21, the said wear disks operating to prevent lost motion in the link 232.

In operation as the carriage 197 is reciprocated through its connection with the eccentric pin 205, the cutter-arms 224, with their cutters 195 are oscillated in timed relation with the movements of the carriage through the medium of the link 232 which has a sliding connection at its lower end with the pin 234 carried by the vertically oscillating lever 236, said lever being accurately guided in its movements by means of the wear plates 240 between which the head 239 of the lever slides.

The cutters 195 are given a rapid rotary movement by means of the belts 243 which belts pass about pulleys 244 mounted on each cutter shaft 219 and about driving pulleys 245 mounted upon a shaft 246, the latter being driven by belt 61 from the pulley 60 mounted upon the shaft 43 as previously described. I prefer to inclose the pulley 61 within a housing 247 provided with a door 248, Fig. 19, through which access may be gained to the housing for the purpose of getting at the belt 61. I also prefer to provide the cutters with a hinged guard 249, as shown in Fig. 23.

In order to vary the speed of rotation of the countershaft 64 through which the cutter carriage is reciprocated, I mount the driving gear 63 upon the countershaft 64 in such a way that the gear may be readily removed and replaced by another gear having a greater or less number of teeth, and in order to compensate for this change of gears, I mount the intermediate gear 62' upon a swinging bracket 250, Fig. 23, which bracket is provided with a slot 251 through which a locking screw 252 passes whereby the intermediate gear may be adjusted and set in meshing relation with the gears 62 and 63. In order to gain access to these gears, I provide the end of the machine frame or housing where these gears are located with an opening closed by a swinging door 253.

*Printing mechanism.*

The printing mechanism for printing the trade mark or brand upon the paper wrapper-strip or web may be of any preferred construction. This mechanism is mounted within a case 254 supported upon a bracket 255 secured to the front end of the machine frame or housing. The paper wrapper-strip X is supported upon a reel 256 as usual, the wrapper-strip being led around an impression roll 257 forming a part of the printing mechanism. A tension roller 258 carried by an arm 259 pivoted at 260 operates to hold the paper wrapper-strip under tension as the strip passes from said tension roller through the trough-guide B. The arm 259 which supports the tension roller is pivoted to the left of the axis of the impression roll 257 and between said axis and the leading-in end of the trough-guide B so that the tension roller 258 may be swung away from said axis in the direction of travel of the paper wrapper-strip through the trough-guide. By so pivoting the said arm, it is not necessary, as is the case with previous constructions, to thread the paper-wrapper-strip through any part of the tension roller or its supporting means. All that is necessary, after the paper wrapper-strip has been passed about the impression roll 257, is to swing the tension roller over into position so that it will bear upon the impression roll, so that the wrapper-strip will be brought around the periphery of the tension roller, all as more clearly shown in Fig. 3. The tension roller may be held in its proper operative position by its own weight or by a spring if desired.

While I have shown the cut-off mechanism as embodying two cutters, obviously one of the cutters may be dispensed with without otherwise altering the construction.

I do not wish to be understood as limiting myself to a machine structure embodying all of the various combinations shown and described; nor do I wish to be understood as limiting myself to the use of all the elements of the different combinations constructed and arranged exactly as herein shown, except as I may be limited by the terms of the appended claims, as I am aware that minor changes and additions may be made without departing from the spirit of the invention.

What I claim is:

1. In a cigarette machine of the continuous rod type, a machine frame and an automatic tobacco feed unit coöperatively associated therewith, said feed unit embodying a tobacco receiving hopper, a tobacco chute and a trough-guide therebelow, the front wall of said chute being arranged below and in substantially the plane of the front wall of the tobacco hopper, and said feed unit being removably supported as a whole upon the machine frame.

2. In a cigarette machine of the continuous rod type, a machine frame having a top-plate and an automatic tobacco feed unit coöperatively associated therewith, said feed unit embodying a tobacco receiving hopper, a tobacco chute and a trough-guide all formed as a part of the feed unit, the front wall of said chute being arranged below and in substantially the plane of the front wall of the tobacco hopper, and said trough-guide having a vertically movable front wall to permit unrestricted access thereto, said feed unit being removably supported upon the top-plate of the machine frame.

3. In a cigarette machine of the continuous rod type, a machine frame, rod-forming instrumentalities carried thereby, and an automatic tobacco feed unit coöperatively associated therewith, said feed unit embodying a trough-guide and a tobacco hopper overlying and removably supported upon said frame and said feed unit having depending supporting legs at one end only, said legs abutting a vertical face of the machine frame, whereby the trough-guide will aline with the rod-forming instrumentalities when the feed unit is positioned upon the machine frame.

4. In a cigarette machine of the continuous rod type, a machine frame having a top plate, leg-supporting ledges below said plate, and a vertical bearing face between the said top-plate and ledges, an automatic tobacco feed unit coöperatively associated with said machine frame, said feed unit embodying a tobacco hopper overlying and removably supported upon said top plate and said hopper having depending supporting legs each resting at its lower end upon one of said leg-supporting ledges and engaging said bearing face.

5. In a cigarette machine of the continuous rod type, a machine frame having a top plate and leg-supporting ledges therebelow, an automatic tobacco feed unit coöperatively associated therewith, said feed unit embodying a tobacco hopper and a trough-guide carried thereby, said hopper and trough-guide overlying and removably supported as a whole from said top plate, and the hopper having depending supporting legs each resting at its lower end upon one of said leg-supporting ledges.

6. In a cigarette machine of the continuous rod type, a machine frame, an automatic tobacco feed embodying a tobacco hopper coöperatively associated with said frame, a pair of carding rolls within the hopper, means for rotating said rolls, one continuously and the other intermittently, a rotary pin roll located within the hopper adjacent the intermittently rotating carding roll, said pin roll being arranged for action upon the mass of tobacco within the hopper to prevent the formation of "air-pockets" in said mass, and means for rotating the pin roll at a greater speed than the speed of rotation of the continuously rotating carding roll.

7. In a cigarette machine of the continuous rod type and in combination, an automatic tobacco feed, a trough-guide associated therewith and having a movable front wall, and means for raising and lowering said wall bodily toward and from the bottom of the trough-guide affording free and unrestricted access thereto.

8. In a cigarette machine of the continuous rod type and in combination, an automatic tobacco feed, a trough-guide associated therewith and having a movable front wall and means for moving said wall longitudinally and upwardly to gain access to said trough-guide.

9. In a cigarette machine of the continuous rod type and in combination, an automatic tobacco feed and a trough-guide coöperatively associated therewith, said trough-guide having a movable front wall, a pair of swinging arms to which said front wall is pivotably connected near its opposite ends, and means for swinging said arms simultaneously to cause the said front wall to move upwardly and longitudinally whereby access may be gained to the trough-guide.

10. In a cigarette machine of the continuous rod type and in combination, an automatic tobacco feed, a trough-guide coöperatively associated therewith, said trough-guide having a movable front wall, a pair of swinging arms to which said front wall is pivotably connected near its opposite ends, an oscillating shaft having an operating handle, a link connection between said swinging arms and an operative connection between said oscillating shaft and one of said arms.

11. In a cigarette machine of the continuous rod type and in combination, a trough-guide, a tube or folder in alinement therewith, an endless tape passing through the tube or folder, a tape-supporting rim, a rotatable driving support for said rim and a slip connection between the rim and its rotatable support permitting manual movement of the rim in one direction independently of the support.

12. In a cigarette machine of the continuous rod type and in combination, a trough-guide, a tube or folder in alinement therewith, an endless tape passing through the tube or folder, a tape-supporting rim, a rotatable support having a grooved periphery, and a finger pivoted to the rim and having a slip connection with the grooved portion of the support whereby the rim may be moved independently of its support.

13. In a cigarette machine of the continuous rod type and in combination, a trough-guide, a tube or folder in alinement therewith, an endless tape passing through the tube or folder, a rotary support for said endless tape, a tightener wheel for the tape, an arm upon one end of which the tighener wheel is mounted, a pivotal mounting for said arm to move said wheel toward and from the periphery of said support, and means for exerting a yielding force upon the opposite end of said arm in a direction to urge the tightener wheel toward the tape support.

14. In a cigarette machine of the continuous rod type and in combination, a trough-guide, a tube or folder in alinement therewith, an endless tape passing through the tube or folder, a rotary support therefor, a tightener wheel for the tape movable toward and from the periphery of the said support, a pivoted arm upon one end of which the tightener wheel is mounted, an eccentric sleeve upon which the arm is mounted, and means for exerting a yielding force upon the opposite end of said arm in a direction to urge the tightener wheel toward the tape-support.

15. In a cigarette machine of the continuous rod type and in combination, a trough-guide, a tube or folder in alinement therewith, an endless tape passing through the tube or folder, a rotary support for the tape, a tape tightening wheel movable toward and from the periphery of said support, a pivoted arm upon one end of which the tightener wheel is mounted, a yielding plunger acting upon the other end of said arm, said plunger operating to urge the tightener wheel toward the rotary tape support and means for varying the yield of the plunger.

16. A cigarette machine of the continuous rod type and in combination, a trough-guide, a tube or folder in alinement therewith, an endless tape passing through the tube or folder, a rotary tape support, a tape tightening wheel, a pivoted arm upon one end of which the tightener wheel is mounted, a yielding plunger acting upon the other end of said arm, and a set screw carried by the lower end of the arm, said screw acting upon the end of the plunger.

17. In a cigarette machine of the continuous rod type and in combination, a trough-guide, a tube or folder in alinement therewith, an endless tape passing through the tube or folder, a rotary tape support, a tape tightening wheel movable toward and from the periphery of said support and a tape-placing guide located adjacent the periphery of the tightener wheel and movable therewith.

18. In a cigarette machine of the continuous rod type and in combination, a trough-guide, a tube or folder in alinement therewith, an endless tape passing through the tube or folder, a rotary tape support, a tape tightening wheel movable toward and from the periphery of said support, a pivoted arm upon one end of which the tightener wheel is mounted, means for exerting a yielding force upon the opposite end of said arm in a direction to urge the tightener wheel toward the tape support, and a tape placing guide carried by and movable with said pivoted arm.

19. In a cigarette machine of the continuous rod type and in combination, a machine frame having a top plate provided with a recess in the front edge thereof, a folder tube in which the cigarette rod is formed, a paste-applying disk associated with said tube for applying a line of paste to an upstanding edge of the wrapper-strip of the cigarette rod as it passes through the tube, a laterally movable paste supply cylinder in which a portion of said disk rotates, and means for adjustably supporting said cylinder with a portion thereof extending within the recess in the front edge of said top plate of the machine frame.

20. In a cigarette machine of the continuous rod type and in combination, a machine frame having a top plate provided with a recess in its front edge, a folder tube in which the cigarette rod is formed, a paste-applying disk associated with said tube for applying a line of paste to an upstanding edge of the wrapper-strip of the cigarette rod as it passes through the tube, an adjustable slide having an opening therethrough, a clamp associated with said slide and a paste supply cylinder extending through and supported by the said clamp and slide, said paste-cylinder lying in the recess in said top plate.

21. In a cigarette machine of the continuous rod type and in combination, a folder tube in which the cigarette rod is formed, an adjustable slide having a head and a circular clamp, a paste cylinder supported by said clamp, a rotary sleeve journaled in said head, a stem removably supported in the sleeve, interconnecting means between said sleeve and stem, and a paste disk carried by the stem, said disk having a portion thereof mounted for rotation in the paste cylinder.

22. In a cigarette machine of the continuous rod type and in combination, a folder tube in which the cigarette rod is formed, an adjustable slide having a head and a circular clamp, a paste cylinder supported by said clamp, a rotary sleeve journaled in said head, a driving gear on said sleeve, sprocket gearing for driving the said driving gear, a stem removably supported in the sleeve, interconnecting means between the sleeve and stem and a paste disk carried by the stem, such disk having a portion thereof mounted for rotation in the paste cylinder.

23. In a cigarette machine of the continuous rod type and in combination, a machine frame having a top plate, a slide adjustably mounted thereon, a vertically adjustable paste cylinder carried thereby, a head on the slide, a paste disk mounted for rotation in the head, and having a portion thereof extending within the paste cylinder and vertically adjustable therewith, a vertically adjustable backing disk coöperatively associated with the paster disk, and a crank arm upon which the backing disk is journaled for rotation.

24. In a cigarette machine of the continuous rod type and in combination, a machine frame having a top plate, a folder tube in which the cigarette rod is formed, a paste-applying disk associated with said tube for applying a line of paste to an upstanding edge of the wrapper-strip of the cigarette rod as it passes through the tube, a backing disk coöperatively associated with the paster disk, a crank arm carrying a stud on which the backing disk is journaled for rotation, said crank arm having an elongated stem, and an elongated adjustable bearing for said stem.

25. In a cigarette machine of the continuous rod type and in combination, a machine frame having a top plate, a folder tube in which the cigarette rod is formed, a paste-applying disk associated with said tube for applying a line of paste to an upstanding edge of the wrapper-strip of the cigarette rod as it passes through the tube, a backing disk coöperatively associated with the paster disk, an elongated stem, a threaded sleeve having a knurled portion in which sleeve the stem is mounted for oscillation, a threaded bearing for the sleeve, a crank arm on the stem, and a stud carried by said arm on which the said backing disk is mounted for rotation.

26. In a cigarette machine of the continuous rod type and in combination, a folder tube in which the cigarette rod is formed, and paster mechanism associated with said tube for applying a line of paste to an upstanding edge of the wrapper-strip of the cigarette rod as it passes through the tube, a paste supply cylinder in which the paste applying disk rotates, a plunger in said cylinder, and means mounted upon and wholly supported by the lower end of the paste-supply cylinder for imparting an elevating force to the plunger.

27. In a cigarette machine of the continuous rod type and in combination, a folder tube in which the cigarette rod is formed, a paste-applying disk associated with said tube for applying a line of paste to an upstanding edge of the wrapper-strip of the cigarette rod as it passes through the tube, a paste supply cylinder, a plunger therein, and plunger operating means comprising a rack bar on the upper end of which said plunger is mounted, a pinion meshing with the teeth of the rack bar, and means for rotating the pinion, said plunger operating means being carried by and wholly supported from the lower end of the said cylinder.

28. In a cigarette machine of the continuous rod type and in combination, a tube or folder in which the cigarette rod is formed and a paster mechanism coöperatively associated with said tube for applying a line of paste to an upstanding edge of the wrapper-strip passing through the tube and embodying a paste cylinder, a rotary paste-applying disk, a plunger operating in the cylinder, a rack bar upon which the plunger is mounted, a cap removably supported upon the lower end of the cylinder, a sleeve carried by the cap, a shaft journaled in the sleeve and having a pinion meshing with the rack bar, and means supported from the sleeve for rotating the said shaft.

29. In a cigarette machine of the continuous rod type and in combination, a tube or folder in which the cigarette rod is formed and a paster mechanism coöperatively associated with said tube for applying a line of paste to an upstanding edge of the wrapper-strip passing through the tube and embodying a paste cylinder, a rotary paste-applying disk, a plunger operating in the cylinder, a rack bar upon which the plunger is mounted, a cap removably supported upon the lower end of the cylinder, a sleeve carried by the cap, a shaft journaled in the sleeve and having a pinion meshing with the rack bar, a ratchet wheel fixed to the shaft, a pulley loose on the shaft, a pawl on the pulley in engagement with the ratchet, and a cord surrounding a portion of the periphery of the pulley and secured thereto at one end and having a weight at its other end.

30. In a cigarette machine of the continuous rod type and in combination, a tube or folder in which the cigarette rod is formed, a paste applying disk adjustable toward and from the tube or folder, and means for positively rotating the disk embodying beveled gears, a sprocket for driving said beveled gears, a driven shaft, a sprocket thereon and a sprocket chain connecting said sprockets, and means maintaining a constant spacing relation between the said sprockets irrespective of the position of said paste applying disk.

31. In a cigarette machine of the continuous rod type and in combination, a tube or folder in which the cigarette rod is formed, a paste-applying disk movable toward and from the tube or folder, and means for positively rotating the disk embodying beveled gears, a sprocket 152 for driving said gears, a driven shaft 54, a sprocket 55 on said shaft, a sprocket chain 56 connecting said sprockets, and an axially adjustable yoke in which the said driven shaft is mounted for rotation.

32. In a cigarette machine of the continuous rod type and in combination, a tube or folder in which the cigarette rod is formed, a paster mechanism coöperatively associated with the tube or folder and embodying a paste cylinder, an adjustable slide upon which said cylinder is mounted, a paste-applying disk receiving paste from said cylinder, and means for rotating the disk embodying a chain driven sprocket 152, a sprocket 55 for driving the sprocket chain, a shaft on which the latter named sprocket is mounted, an axially adjustable yoke in which said shaft is mounted, and a link connection between the said yoke and adjustable slide.

33. In a continuous rod cigarette machine the combination of the cigarette rod forming and wrapping instrumentalities, with a cut-off mechanism for severing the rod into cigarette lengths, embodying a reciprocating carriage, a rod support upon which said carriage is mounted for reciprocation, a guide for the front edge of the carriage, an oscillating arm mounted upon the carriage, a cutter at one end of said arm, and means for oscillating the arm to move the cutter across the path of travel of the cigarette rod.

34. In a continuous rod cigarette machine and in combination, cigarette rod forming instrumentalities, and a cut-off mechanism for severing the cigarette rod into cigarette lengths, embodying a reciprocating carriage, a cutter-carrying arm mounted for oscillation on said carriage, a link for oscillating said arm and an actuating lever for said link and with which the link has a slidable connection for reciprocation thereon.

35. In a continuous rod cigarette machine and in combination, cigarette rod forming instrumentalities, and a cut-off mechanism for severing the cigarette rod into cigarette lengths, embodying a reciprocating carriage, a cutter-carrying arm mounted for oscillation on said carriage, a link for oscillating said arm, and a pivoted actuating lever having spaced arms at one end and a rod connecting said arms and with which the lower end of said link has a slidable connection for reciprocation thereon.

36. In a continuous rod cigarette machine and in combination, rod forming instrumentalities, and a cut-off mechanism for severing the rod into cigarette lengths, embodying a reciprocating carriage, a cutter-carrying arm mounted for oscillation on said carriage, means for axially adjusting the said arm, a bell-crank lever with which said arm has an adjustable connection, a link connection with said bell-crank lever for actuating the arm and a pivoted actuating lever with which said arm has a slidable connection for reciprocation thereon.

37. In a continuous rod cigarette machine and in combination, rod forming instrumentalities, and a cut-off mechanism for severing the cigarette rod into cigarette lengths, embodying a reciprocating carriage, a cutter-carrying arm mounted for oscillation on said carriage, a link for oscillating said arm, an actuating lever with which one end of said link has a slidable connection for reciprocation thereon, a head at the free end of said actuating lever and wear-plates between which the head of said lever moves.

38. In a continuous rod cigarette machine and in combination, rod forming instrumentalities, and a cut-off mechanism for severing the rod into cigarette lengths, embodying a reciprocating carriage, a cutter-carrying arm mounted for oscillation on said carriage, a link for oscillating said arm, an actuating lever for said link and with which the latter has a slidable connection for reciprocation thereon and a drum cam having an eccentric stud in one end for reciprocating the carriage, and a cam-groove in its periphery for operating the actuating lever.

39. In a continuous rod cigarette machine and in combination, cigarette rod forming instrumentalities, and a cut-off mechanism for severing the rod into cigarette lengths, embodying a reciprocating carriage, a pair of spaced cutter-carrying arms, an oscillating sleeve mounted upon the carriage and upon which said arms are clamped for adjustment, an actuated link for oscillating said arms and a pivoted lever with which said link has a slidable connection for reciprocation thereon.

40. In a continuous rod cigarette machine and in combination, cigarette rod forming instrumentalities, and a cut-off mechanism for severing the rod into cigarette lengths, embodying a reciprocating carriage having a pair of spaced upstanding arms, a rod connecting said arms, a sleeve mounted for oscillation about said rod, a pair of cutter-carrying arms each having a clamp at one end surrounding said sleeve, a bell-crank lever mounted upon the sleeve and having a connection from one arm thereof with both the said cutter-carrying arms, a vertically reciprocating link connected with the other arm of the bell-crank lever, an actuating lever with which the lower end of said link has a sliding connection for reciprocation thereon, and means for operating the actuating lever.

41. In a continuous rod cigarette machine and in combination, cigarette rod forming instrumentalities, and a cut-off mechanism for severing the rod into cigarette lengths, embodying a reciprocating carriage, a cutter-carrying arm mounted for oscillation on said carriage, a vertical shaft mounted for rotation beneath the carriage, a drum cam mounted upon the end of said shaft, an eccentric stud adjustably mounted upon the head of said drum cam, a connection between said eccentric stud and the under side of said carriage for reciprocating the latter and means operated from the drum cam for oscillating the cutter carrying arm.

42. In a continuous rod cigarette machine and in combination, rod forming instrumentalities, and a cut-off mechanism for severing the rod into cigarette lengths, embodying a reciprocating carriage, a cutter-carrying arm mounted for oscillation on said carriage, means for oscillating said cutter-carrying arm, and means for reciprocating the carriage embodying a vertical shaft, a cam drum mounted upon said shaft, an eccentric stud mounted on one end of said cam drum, a pair of guides mounted upon the under side of the carriage and a block mounted for movement between said guides and into which the eccentric stud extends and has free movement.

43. In a continuous rod cigarette machine and in combination, rod forming instrumentalities, and a cut-off mechanism for severing the rod into cigarette lengths, embodying a reciprocating carriage, a fixed supporting rod upon which said carriage is mounted for reciprocation, a guide for the front edge of the carriage, a pair of spaced upstanding arms mounted upon the carriage, a rod connecting said upstanding arms, a sleeve mounted for oscillation upon said connecting rod, a pair of cutter-carrying arms each clamped at one end to said sleeve and each having a slotted wing, a bell-crank lever mounted upon said sleeve and with one arm of which each of the said slotted wings of the cutter-carrying arms has an adjustable connection, an actuating link pivoted at one end to the other arm of said bell-crank lever, and a pivoted actuating lever with which the said link has a sliding connection.

44. In a continuous rod cigarette machine and in combination, rod forming instrumentalities, and a cut-off mechanism for severing the rod into cigarette lengths, embodying a reciprocating carriage, a supporting rod thereon, a sleeve mounted for oscillation upon said rod, a pair of cutter-carrying arms each having a clamp at one end surrounding said sleeve, said clamps with their arms being adjustable toward and from each other and axially upon the sleeve, and means for oscillating said cutter-carrying arms.

45. In a continuous rod cigarette machine and in combination, an automatic tobacco feed, rod forming instrumentalities, including a rotary paster disk, and a cut-off mechanism for severing the cigarette rod into cigarette lengths, said cut-off embodying a reciprocating carriage and an oscillating cutter-carrying arm, a main drive shaft having driving means loose thereon for driving the tobacco feed mechanism, a counter-shaft having driving connections with said paster disk and cut-off mechanism respectively, a driving connection between the main drive shaft and the said counter-shaft, and separate independently operable clutch mechanisms between the main drive shaft and the means thereon for driving the tobacco feed mechanism and the driving connection between said main shaft and the counter-shaft, means for driving the main shaft and a clutch mechanism for such drive operable from a plurality of positions about the machine.

46. In a cigarette machine of the continuous rod type and in combination, an automatic tobacco feed, rod forming instrumentalities including a rotary paster disk, and a cut-off mechanism for severing the cigarette rod into cigarette lengths, a main drive shaft having a cone pulley loose thereon for driving the tobacco feed mechanism, a counter-shaft having driving connections with the said paster disk and cut-off mechanism respectively, a driving connection between the main drive shaft and the said counter-shaft, separate clutch mechanisms between the main drive shaft and the cone pulley and between the main drive shaft and the driving connection between said last named shaft and the counter-shaft, oscillating shafts for operating said clutches, and weighted arms on said operating shafts for actuating the latter and for maintaining the clutches in their operative and inoperative positions.

47. In a cigarette machine of the continuous rod type and in combination, a trough-guide, a printing mechanism including an impression roll, a support for a reel of cigarette wrapper-strip or web one end of which is led about the impression roll of the printing mechanism and extends therefrom through the trough-guide, a swinging arm pivoted at a point adjacent the impression roll and between the axis thereof and the leading-in end of the trough-guide, and a tension roller mounted upon the free end of said pivoted arm, said roller being arranged to rest upon the wrapper-strip as it passes from the impression roll and operating to maintain the wrapper-strip in close contact with the periphery of the impression roll.

48. In a cigarette machine of the continuous rod type and in combination, a machine frame, a trough-guide supported thereon, a printing mechanism supported at one end of said main frame in advance of the trough-guide, said printing mechanism including an impression roll, a support for a reel of cigarette wrapper strip, one end of which is led about the impression roll and extends therefrom through the trough-guide, a swinging arm pivoted at a point adjacent the impression roll and between the axis thereof and the leading-in end of the trough guide, and a tension roller mounted upon the free end of said arm, said roller being arranged to rest upon the wrapper strip as it passes from the impression roll to the trough-guide and operating to maintain the wrapper strip in close contact with the periphery of the impression roll and hold the same under tension.

In testimony whereof I affix my signature in the presence of two witnesses.

WILLIAM C. BRIGGS.

Witnesses:
R. O. BRIGGS, [L. S.]
T. REVERIL. [L. S.]